(12) United States Patent
Oishi et al.

(10) Patent No.: US 12,474,458 B2
(45) Date of Patent: *Nov. 18, 2025

(54) COMMUNICATION DEVICE, INFORMATION PROCESSING METHOD, AND NON-TRANSITORY COMPUTER-READABLE STORAGE MEDIUM

(71) Applicants: KABUSHIKI KAISHA TOKAI RIKA DENKI SEISAKUSHO, Aichi (JP); NAGOYA INSTITUTE OF TECHNOLOGY, Aichi (JP)

(72) Inventors: Yoshiki Oishi, Aichi (JP); Kenichi Koga, Aichi (JP); Tatsuya Koike, Aichi (JP); Kento Kataoka, Aichi (JP); Nobuyoshi Kikuma, Aichi (JP)

(73) Assignees: KABUSHIKI KAISHA TOKAI RIKA DENKI SEISAKUSHO, Aichi (JP); NAGOYA INSTITUTE OF TECHNOLOGY, Aichi (JP)

( * ) Notice: Subject to any disclaimer, the term of this patent is extended or adjusted under 35 U.S.C. 154(b) by 399 days.

This patent is subject to a terminal disclaimer.

(21) Appl. No.: 18/098,992

(22) Filed: Jan. 19, 2023

(65) Prior Publication Data

US 2023/0243947 A1  Aug. 3, 2023

(30) Foreign Application Priority Data

Feb. 3, 2022 (JP) .................................. 2022-015472
Oct. 11, 2022 (JP) .................................. 2022-163508

(51) Int. Cl.
*G01S 11/08* (2006.01)
*G01S 13/76* (2006.01)

(52) U.S. Cl.
CPC ................ *G01S 11/08* (2013.01); *G01S 13/76* (2013.01)

(58) Field of Classification Search
CPC ........ G01S 11/08; G01S 13/76; G01S 13/765; G01S 13/931; G01S 3/48; G01S 7/006
See application file for complete search history.

(56) References Cited

U.S. PATENT DOCUMENTS

| 2009/0323777 A1* | 12/2009 | Wang | ............... H04B 1/71072 |
| | | | 375/E1.02 |
| 2017/0177769 A1* | 6/2017 | Bouzinov | ............... G06F 17/11 |
| 2022/0057502 A1* | 2/2022 | Oishi | ............... G01S 13/765 |

FOREIGN PATENT DOCUMENTS

WO    2015/176776 A1    11/2015

* cited by examiner

*Primary Examiner* — Timothy X Pham
(74) *Attorney, Agent, or Firm* — GREENBLUM & BERNSTEIN P.L.C

(57) ABSTRACT

A communication device comprising: a wireless communication section configured to wirelessly receive a signal from another communication device; and a control section configured to estimate a reception time of the second signal based on the expanded signal matrix that minimizes the predetermined norm, wherein the control section executes the iterative calculation separately at a plurality of stages, sets a value of the regularization parameter used for the iterative calculation at or after a second stage of the plurality of stages to a value of the regularization parameter or more used for the iterative calculation at a previous stage, and changes the value of the regularization parameter based on a reception status of the second signal during the iterative calculation at or after the second stage.

15 Claims, 20 Drawing Sheets

COMMUNICATION DEVICE, INFORMATION PROCESSING METHOD, AND NON-TRANSITORY COMPUTER-READABLE STORAGE MEDIUM

CROSS REFERENCE TO RELATED APPLICATION(S)

This application is based upon and claims benefit of priority from Japanese Patent Application No. 2022-015472, filed on Feb. 3, 2022, and Japanese Patent Application No. 2022-163508 filed on Oct. 11, 2022, the entire contents of which are incorporated herein by reference.

BACKGROUND

The present invention relates to a communication device, an information processing method, and a non-transitory computer-readable storage medium.

In recent years, technologies that allow one device to determine a position of another device in accordance with a result of transmitting/receiving a signal between the devices have been developed. As an example of the technologies of determining a position, WO 2015/176776 A1 discloses a technology that allows an UWB (ultra-wideband) receiver to determine an angle of incidence of a wireless signal from an UWB transmitter by performing wireless communication section using UWB.

However, although the technology disclosed in WO 2015/176776 A1 determines the angle of incidence of the wireless signal, there is a room for improvement in accuracy of measuring a distance between the UWB receiver and the UWB transmitter.

In other words, it has been desired to further improve the accuracy of measuring a distance between devices with regard to the technologies of measuring a distance between one device and another device.

Accordingly, the present invention is made in view of the aforementioned issues, and an object of the present invention is to provide a mechanism that makes it possible to improve accuracy of measuring a distance between a plurality of devices.

SUMMARY

To solve the above described problem, according to an aspect of the present invention, there is provided a communication device comprising: a wireless communication section configured to wirelessly receive a signal from another communication device; and a control section configured to correlate a first signal with a second signal at a designated interval, the second signal being a signal associated with the first signal, and being received by the wireless communication section in a case where the other communication device transmits a signal including a pulse as the first signal, convert a data matrix into a format including a matrix product of an expanded modal matrix and an expanded signal matrix, the data matrix being a matrix obtained by arranging one or a plurality of correlation computation results that are each a result obtained by correlating the first signal with the second signal of the wireless communication section at the designated interval, the expanded modal matrix being a matrix including a plurality of elements indicating the correlation computation results obtained on an assumption that the signal is received at respective set times, the expanded signal matrix being a matrix obtained by arranging expanded signal vectors for the one or the plurality of correlation computation results, and the expanded signal vector being a vector including a plurality of elements each indicating whether or not there is the signal of the wireless communication section at each of the set times, and an amplitude and a phase of the signal, estimate the expanded signal matrix that minimizes a predetermined norm by iterative calculation that uses a regularization parameter that is a positive infinitesimal, and estimate a reception time of the second signal based on the expanded signal matrix that minimizes the predetermined norm, wherein the control section executes the iterative calculation separately at a plurality of stages, sets a value of the regularization parameter used for the iterative calculation at or after a second stage of the plurality of stages to a value of the regularization parameter or more used for the iterative calculation at a previous stage, and changes the value of the regularization parameter based on a reception status of the second signal during the iterative calculation at or after the second stage.

To solve the above described problem, according to another aspect of the present invention, there is provided an information processing method comprising: correlating a first signal with a second signal at a designated interval, the second signal being a signal associated with the first signal, and being received by a wireless communication section in a case where another communication device transmits a signal including a pulse as the first signal; converting a data matrix into a format including a matrix product of an expanded modal matrix and an expanded signal matrix, the data matrix being a matrix obtained by arranging one or a plurality of correlation computation results that are each a result obtained by correlating the first signal with the second signal of the wireless communication section at the designated interval, the expanded modal matrix being a matrix including a plurality of elements indicating the correlation computation results obtained on an assumption that the signal is received at respective set times, the expanded signal matrix being a matrix obtained by arranging expanded signal vectors for the one or the plurality of correlation computation results, and the expanded signal vector being a vector including a plurality of elements each indicating whether or not there is the signal of the wireless communication section at each of the set times, and an amplitude and a phase of the signal; estimating the expanded signal matrix that minimizes a predetermined norm by iterative calculation that uses a regularization parameter that is a positive infinitesimal; and estimating a reception time of the second signal based on the expanded signal matrix that minimizes the predetermined norm, wherein the estimating further includes executing the iterative calculation separately at a plurality of stages, setting a value of the regularization parameter used for the iterative calculation at or after a second stage of the plurality of stages to a value of the regularization parameter or more used for the iterative calculation at a previous stage, and changing the value of the regularization parameter based on a reception status of the second signal during the iterative calculation at or after the second stage.

To solve the above described problem, according to another aspect of the present invention, there is provided a non-transitory computer-readable storage medium that stores a program causing a computer to function as a control section configured to correlate a first signal with a second signal at a designated interval, the second signal being a signal associated with the first signal, and being received by a wireless communication section in a case where another communication device transmits a signal including a pulse as the first signal, convert a data matrix into a format including a matrix product of an expanded modal matrix and an expanded signal matrix, the data matrix being a matrix obtained by arranging one or a plurality of correlation computation results that are each a result obtained by correlating the first signal with the second signal of the wireless communication section at the designated interval, the expanded modal matrix being a matrix including a plurality of elements indicating the correlation computation results obtained on an assumption that the signal is received at respective set times, the expanded signal matrix being a matrix obtained by arranging expanded signal vectors for the plurality of correlation computation results, and the expanded signal vector being a vector including a plurality of elements each indicating whether or not there is the signal of the wireless communication section at each of the set times, and an amplitude and a phase of the signal, estimate the expanded signal matrix that minimizes a predetermined norm by iterative calculation that uses a regularization parameter that is a positive infinitesimal, and estimate a reception time of the second signal based on the expanded signal matrix that minimizes the predetermined norm, wherein the program causes the control section to execute the iterative calculation separately at a plurality of stages, set a value of the regularization parameter used for the iterative calculation at or after a second stage of the plurality of stages to a value of the regularization parameter or more used for the iterative calculation at a previous stage, and change the value of the regularization parameter based on a reception status of the second signal during the iterative calculation at or after the second stage.

As described above, according to the present invention, it is possible to provide the mechanism that can improve measurement accuracy of a distance between a plurality of devices.

DETAILED DESCRIPTION OF THE EMBODIMENT(S)

Figure 1:
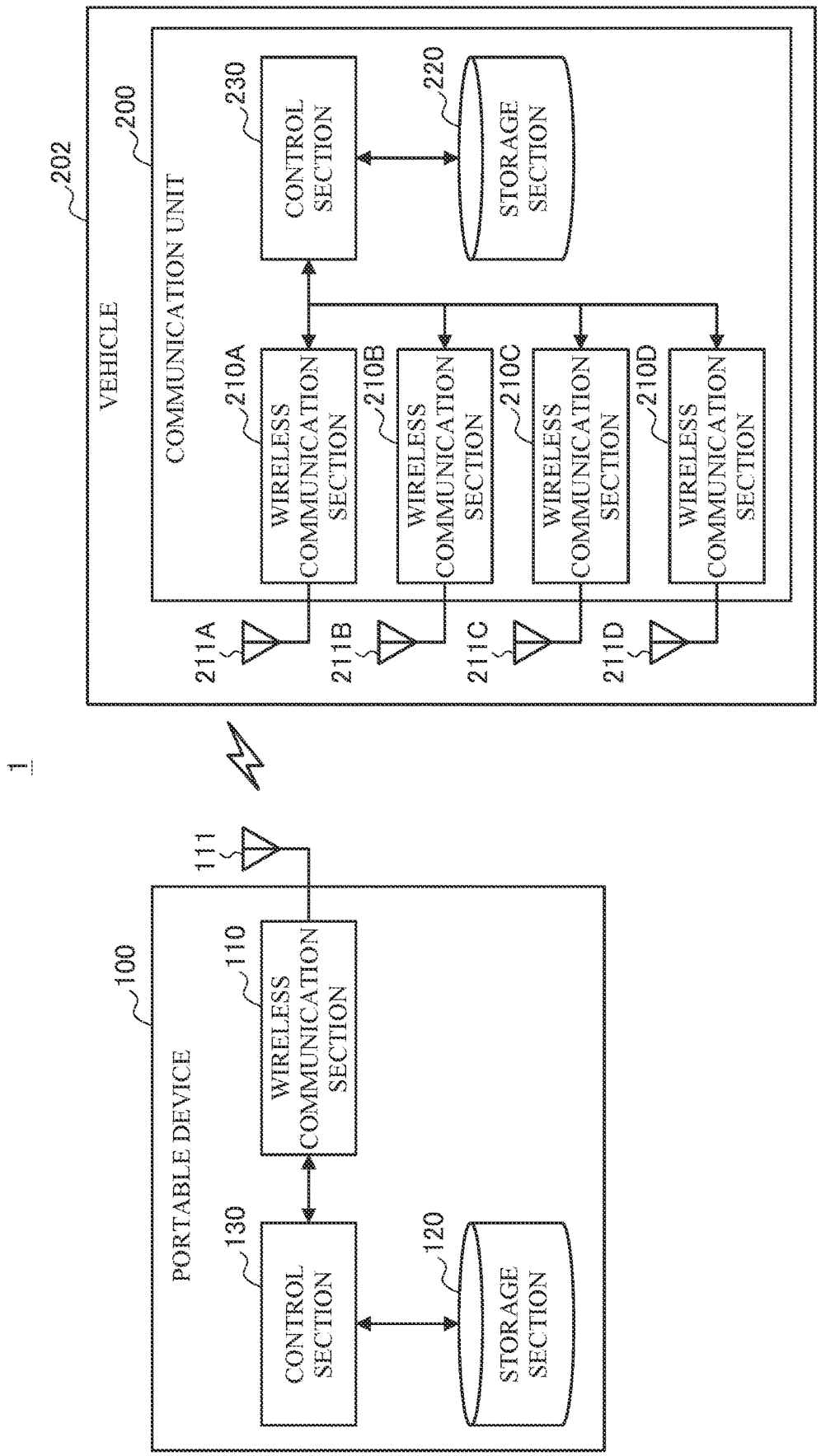
FIG. 1 is a diagram illustrating an example of a configuration of a system according to an embodiment of the present invention.

Hereinafter, preferred embodiments of the present invention will be described in detail with reference to the appended drawings. It should be noted that, in this specification and the appended drawings, structural elements that have substantially the same function and structure are denoted with the same reference numerals, and repeated explanation thereof is omitted.

Furthermore, in this specification and the drawings, different alphabets are suffixed to a same reference numeral to distinguish elements that have substantially the same function and structure. For example, a plurality of elements that have substantially the same function and structure are distinguished as wireless communication sections 210A, 210B, and 210C as necessary. However, in a case where there is no need in particular to distinguish elements that have substantially the same function and structure, the same reference numeral alone is assigned. For example, in a case in which it is not necessary to particularly distinguish the wireless communication sections 210A, 210B, and 210C, the wireless communication sections 210A, 210B, and 210C are simply referred to as the wireless communication sections 210.

1. Configuration Example

FIG. 1 is a view illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee and a communication device of an authenticator are involved in the present invention. In the example illustrated in FIG. 1, the portable device 100 is an example of the communication device of the authenticatee, and the communication unit 200 is an example of the communication device of the authenticator.

When a user (e.g., a driver of the vehicle 202) approaches the vehicle 202 carrying the portable device 100, the system 1 performs wireless communication for authentication between the portable device 100 and the communication unit 200 installed in the vehicle 202. Furthermore, when the authentication succeeds, a door lock of the vehicle 202 is unlocked or an engine is started, and thereby the vehicle 202 becomes available for the user. The system 1 is also referred to as a smart entry system. Next, respective structural elements will be described in order.

(1) Portable Device 100

The portable device 100 is configured as any device to be carried by the user. The any device includes an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 receives a wireless signal from the communication unit 200 installed in the vehicle 202, and transmits the wireless signal.

Wireless communication is performed between the wireless communication section 110 and the communication unit 200 by using a signal that uses, for example, an Ultra-WideBand (UWB). Using an impulse system for the wireless communication of the signal that uses the UWB makes it possible to accurately measure a propagation delay time of a radio wave by using the radio wave of an ultra-short pulse width of a nanosecond or less, so that it is possible to accurately perform ranging based on the propagation delay time. Note that the propagation delay time is a time from transmission to reception of the radio wave. The wireless communication section 110 is configured as, for example, a communication interface that can perform communication using the UWB.

Note that the signal that uses the UWB may be transmitted/received as, for example, a ranging signal, an angle estimation signal, and a data signal. The ranging signal is a signal transmitted and received by the ranging process (to be described later). The ranging signal may be configured in a frame format that does not include a payload part for storing data, or in a frame format that includes the payload part. The angle estimation signal is a signal transmitted and received by an angle estimation process (to be described later). The angle estimation signal may be configured similarly to the ranging signal. The data signal is preferably configured in the frame format that includes the payload part for storing the data.

Here, the wireless communication section 110 includes at least one antenna 111. Furthermore, the wireless communication section 110 transmits/receives a wireless signal via the at least one antenna 111.

The storage section 120 has a function of storing various pieces of information for operating the portable device 100. For example, the storage section 120 stores a program for operating the portable device 100, and an identifier (ID), a password, an authentication algorithm and the like for authentication. For example, the storage section 120 includes, for example, a storage medium such as flash memory, and a processing device that executes recording/playback on/of the storage medium.

The control section 130 has a function of executing processes in the portable device 100. For example, the control section 130 controls the wireless communication section 110 to perform communication with the communication unit 200 of the vehicle 202. The control section 130 reads information from the storage section 120, and writes information into the storage section 120. The control section 130 also functions as an authentication control section that controls an authentication process between the portable device 100 and the communication unit 200 of the vehicle 202. The control section 130 may include, for example, a Central Processing Unit (CPU) and an electronic circuit such as a microprocessor.

(2) Communication Unit 200

The communication unit 200 is installed in association with the vehicle 202. Here, it is assumed that the communication unit 200 is installed in the vehicle 202 in such a manner that the communication unit 200 is installed in a vehicle compartment of the vehicle 202, the communication unit 200 is built in the vehicle 202 as a communication module, or in other manners. In addition, the communication unit 200 and the vehicle 202 may be configured as separate objects in such a manner that the communication unit 200 is installed in a parking space for the vehicle 202 or in other manners. In this case, the communication unit 200 may wirelessly transmit a control signal to the vehicle 202 based on a result of communication with the portable device 100, and may remotely control the vehicle 202. As illustrated in FIG. 1, the communication unit 200 includes the plurality of wireless communication sections 210 (210A to 210D), a storage section 220, and a control section 230.

The wireless communication section 210 has a function of performing wireless communication with the wireless communication section 110 of the portable device 100. The wireless communication section 210 receives a wireless signal from the portable device 100, and transmits a wireless signal to the portable device 100. The wireless communication section 210 is configured as, for example, a communication interface that can perform communication using the UWB.

Here, each of the wireless communication sections 210 includes an antenna 211. Furthermore, each of the wireless communication sections 210 transmits/receives a wireless signal via the antenna 211.

The storage section 220 has a function of storing various pieces of information for operating the communication unit 200. For example, the storage section 220 stores a program for operating the communication unit 200, an authentication algorithm, and the like. For example, the storage section 220 includes, for example, a storage medium such as flash memory, and a processing device that executes recording/playback on/of the storage medium.

The control section 230 has a function of controlling an overall operation of the communication unit 200 and in-vehicle equipment installed in the vehicle 202. For example, the control section 230 controls the wireless communication sections 210 to perform communication with the portable device 100. The control section 230 reads information from the storage section 220, and writes information into the storage section 220. The control section 230 also functions as an authentication control section that controls the authentication process between the portable device 100 and the communication unit 200. Furthermore, the control section 230 also functions as a door lock control section that controls the door lock of the vehicle 202, and locks and unlocks the door lock. Furthermore, the control section 230 also functions as an engine control section that controls the engine of the vehicle 202, and starts/stops the engine. Note that a power source installed in the vehicle 202 may be a motor or the like in addition to the engine. The control section 230 is configured as, for example, an electronic circuit such as an Electronic Control Unit (ECU).

2. Technical Features

<2.1. Positional Parameter>

The communication unit 200 (specifically, control section 230) according to the present embodiment performs a positional parameter estimation process of estimating a positional parameter that indicates a position of the portable device 100. Hereinafter, various definitions related to the positional parameter will be described with reference to FIGS. 2 to 4.

Figure 2:
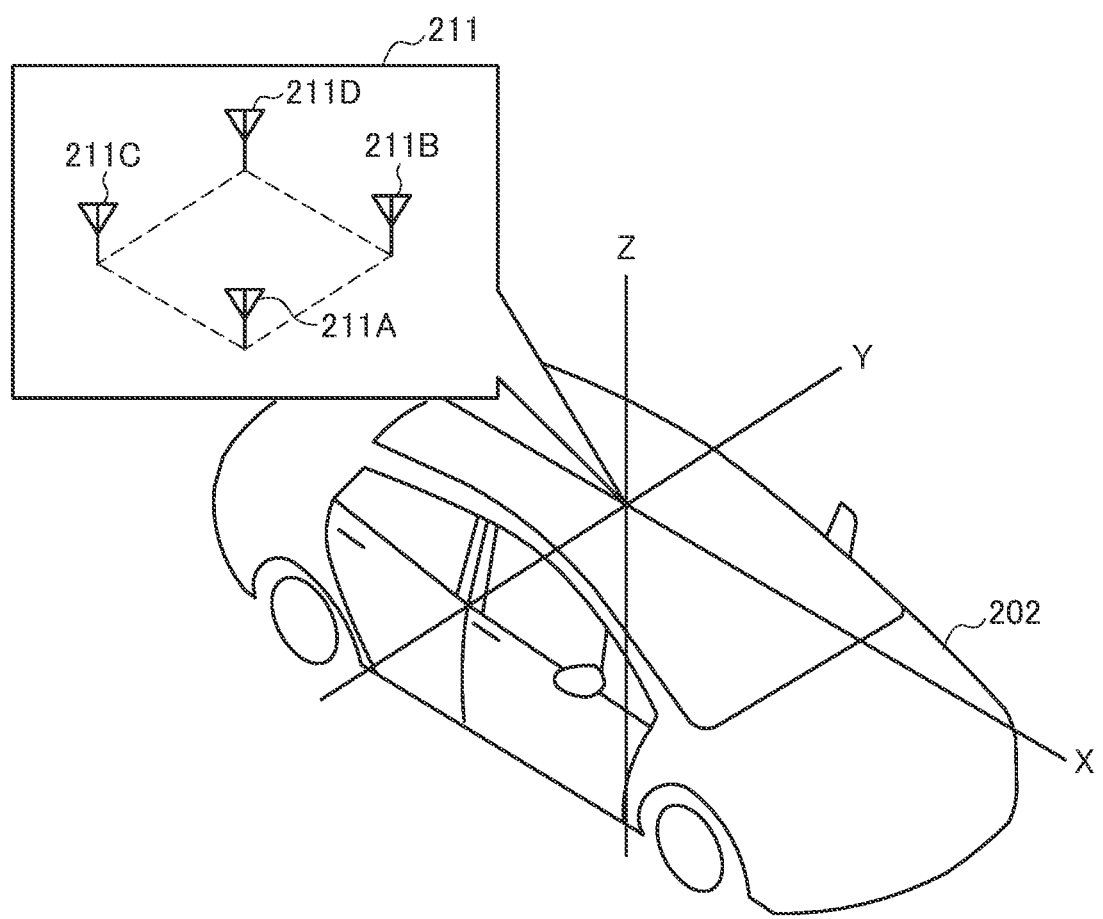
FIG. 2 is a view illustrating an example of arrangement of a plurality of antennas installed in a vehicle according to the present embodiment.

FIG. 2 is a view illustrating an example of arrangement of the plurality of antennas 211 (wireless communication sections 210) installed in the vehicle 202 according to the present embodiment. As illustrated in FIG. 2, the four antennas 211 (211A to 211D) are installed on a ceiling of the vehicle 202. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that a distance between the adjacent antennas 211 is set to half or less of a wavelength λ of an angle estimation signal (to be described later). A local coordinate system of the communication unit 200 is set as a coordinate system based on the communication unit 200. An example of the local coordinate system of the communication unit 200 is a coordinate system whose origin is the center of the four antennas 211, whose front-rear direction of the vehicle 202 is an X axis, whose left-right direction of the vehicle 202 is a Y axis, and whose up-down direction of the vehicle 202 is a Z axis. Note that the X axis is parallel to lines connecting the antenna pairs (e.g., the antenna 211A and the antenna 211C, and the antenna 211B and the antenna 211D) in the front-rear direction. Furthermore, the Y axis is parallel to lines connecting the antenna pairs (e.g., the antenna 211A and the antenna 211B, and the antenna 211C and the antenna 211D) in the left-right direction.

Note that the arrangement shape of the four antennas 211 is not limited to the square shape, and may be a parallelogram shape, a trapezoid shape, a rectangular shape, or any other shapes. Of course, the number of the antennas 211 is not limited to four.

Figure 3:
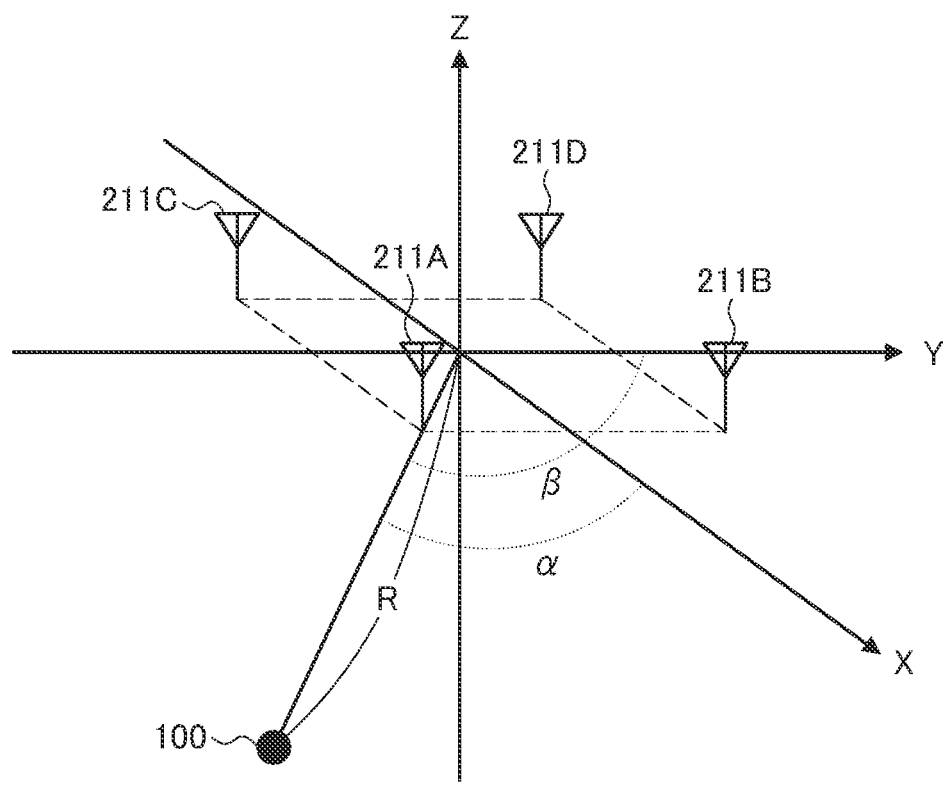
FIG. 3 is a view illustrating an example of a positional parameter of a portable device according to the present embodiment.

FIG. 3 is a view illustrating an example of positional parameters of the portable device 100 according to the present embodiment. The positional parameters may include a distance R between the portable device 100 and the communication unit 200. The distance R illustrated in FIG. 3 is a distance from the origin of the local coordinate system of the communication unit 200 to the portable device 100. The distance R is estimated based on a result of transmission/reception of a ranging signal (to be described later) performed between the one wireless communication section 210 of the plurality of wireless communication sections 210 and the portable device 100. The distance R may be a distance from the one wireless communication section 210 that transmits/receives the ranging signal (to be described later) to the portable device 100.

Furthermore, the positional parameters may include an angle of the portable device 100 that is based on the communication unit 200, and includes an angle α between the X axis and the portable device 100 and an angle β between the Y axis and the portable device 100 illustrated in FIG. 3. The angles α and β are angles formed between the coordinate axes and a straight line connecting the origin of a first predetermined coordinate system and the portable device 100. For example, the first predetermined coordinate system is the local coordinate system of the communication unit 200. The angle α is an angle formed between the X axis and the straight line connecting the origin and the portable device 100. The angle β is an angle between the Y axis and the straight line connecting the origin and the portable device 100.

Figure 4:
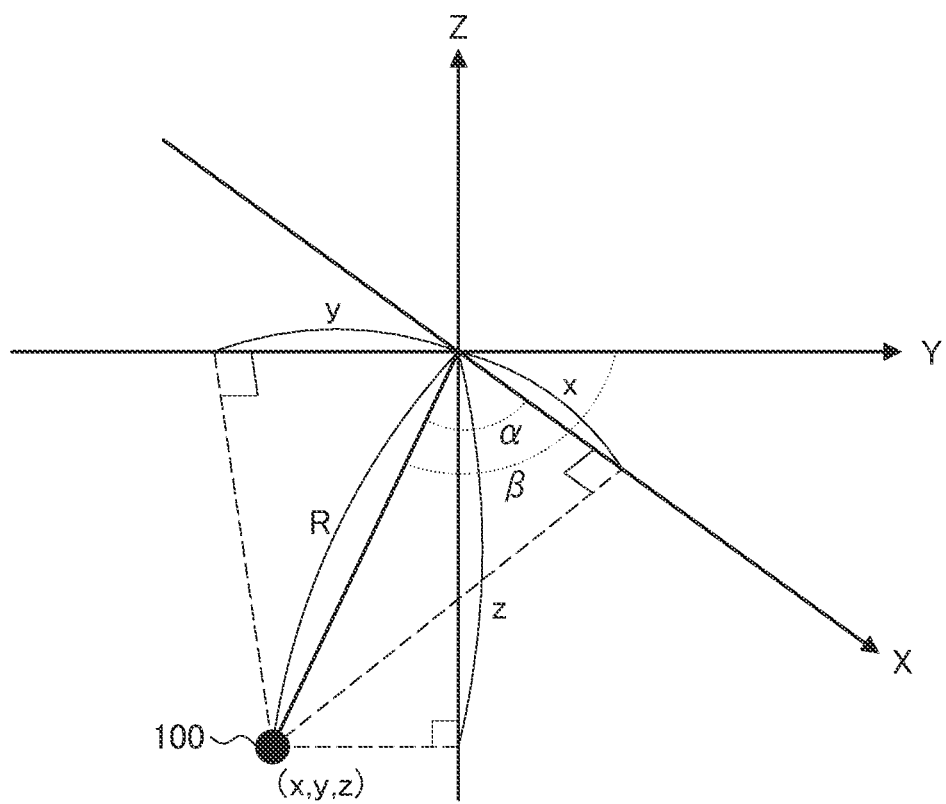
FIG. 4 is a view illustrating an example of the positional parameter of the portable device according to the present embodiment.

FIG. 4 is a view illustrating an example of positional parameters of the portable device 100 according to the present embodiment. The positional parameters may include coordinates of the portable device 100 in a second predetermined coordinate system. A coordinate x on the X axis, a coordinate y on the Y axis, and a coordinate z on the Z axis of the portable device 100 illustrated in FIG. 4 are an example of such coordinates. That is, the second predetermined coordinate system may be the local coordinate system of the communication unit 200. In addition, the second predetermined coordinate system may be a global coordinate system.

<2.2. CIR>

(1) CIR Calculation Process

In the positional parameter estimation process, the portable device 100 and the communication unit 200 communicate with each other to estimate the positional parameters. At this time, the portable device 100 and the communication unit 200 calculate Channel Impulse Responses (CIRs).

The CIR is a response obtained when an impulse is input to the system. In the case where a wireless communication section of one of the portable device 100 and the communication unit 200 (hereinafter, also referred to as a transmitter) transmits a signal including a pulse as a first signal, the CIR according to the present embodiment is calculated based on a second signal that corresponds to the first signal and is received by a wireless communication section of the other one (hereinafter, also referred to as a receiver). It can be said that the CIR indicates characteristics of a wireless communication path between the portable device 100 and the communication unit 200. Hereinafter, the first signal is also referred to as a transmission signal, and the second signal is also referred to as a reception signal.

For example, the CIR may be a correlation computation result that is a result obtained by correlating the transmission signal with the reception signal at each designated interval. Here, the correlation may be sliding correlation that is a process of correlating the transmission signal with the reception signal by shifting relative positions of the signals in time directions. The CIR includes a correlation value indicating a degree of the correlation between the transmission signal and the reception signal as an element per time whose interval is each designated interval. The designated interval is, for example, an interval at which the receiver samples the reception signal. Therefore, an element included in the CIR is also referred to as a sampling point. The correlation value may be a complex number including the IQ components. Furthermore, the correlation value may be an amplitude or a phase of a complex number. Furthermore, the correlation value may be electric power that is a sum of squares of an I component and a Q component of the complex number (or a square of the amplitude).

The CIR is also regarded as a set of elements that are values (hereinafter, also referred to as CIR values) at respective times. In this case, the CIR is a chronological change in the CIR value. In the case where the CIR is the correlation computation result, the CIR value is the correlation value.

Note that the portable device 100 and the communication unit 200 obtain a time by using a time counter. The time counter is a counter that counts (typically, increments) a value (hereinafter, also referred to as a count value) indicating an elapsed time at a predetermined time interval (hereinafter, also referred to as a count cycle). A current time is calculated based on the count value counted by the time counter, the count cycle, and a count start time. A case where count cycles and count start times match between different devices means that these devices are in synchronization with each other. On the other hand, a case where at least any of the count cycle and the count start time is different between the different devices means that these devices are not in synchronization with each other or are asynchronous with each other. The portable device 100 and the communication unit 200 may be in synchronization with each other or asynchronous with each other. Furthermore, the plurality of respective wireless communication sections 210 may be in synchronization with each other or asynchronous with each other. The above designated interval used when the CIR is calculated may be an integer multiple of the count cycle of the time counter. Hereinafter, description will be given assuming that the portable device 100 and the plurality of respective wireless communication sections 210 are in synchronization with each other unless otherwise noted in particular.

Hereinafter, a CIR calculation process in the case where the transmitter is the portable device 100 and the receiver is the communication unit 200 will be described in detail with reference to FIGS. 5 and 6.

Figure 5:
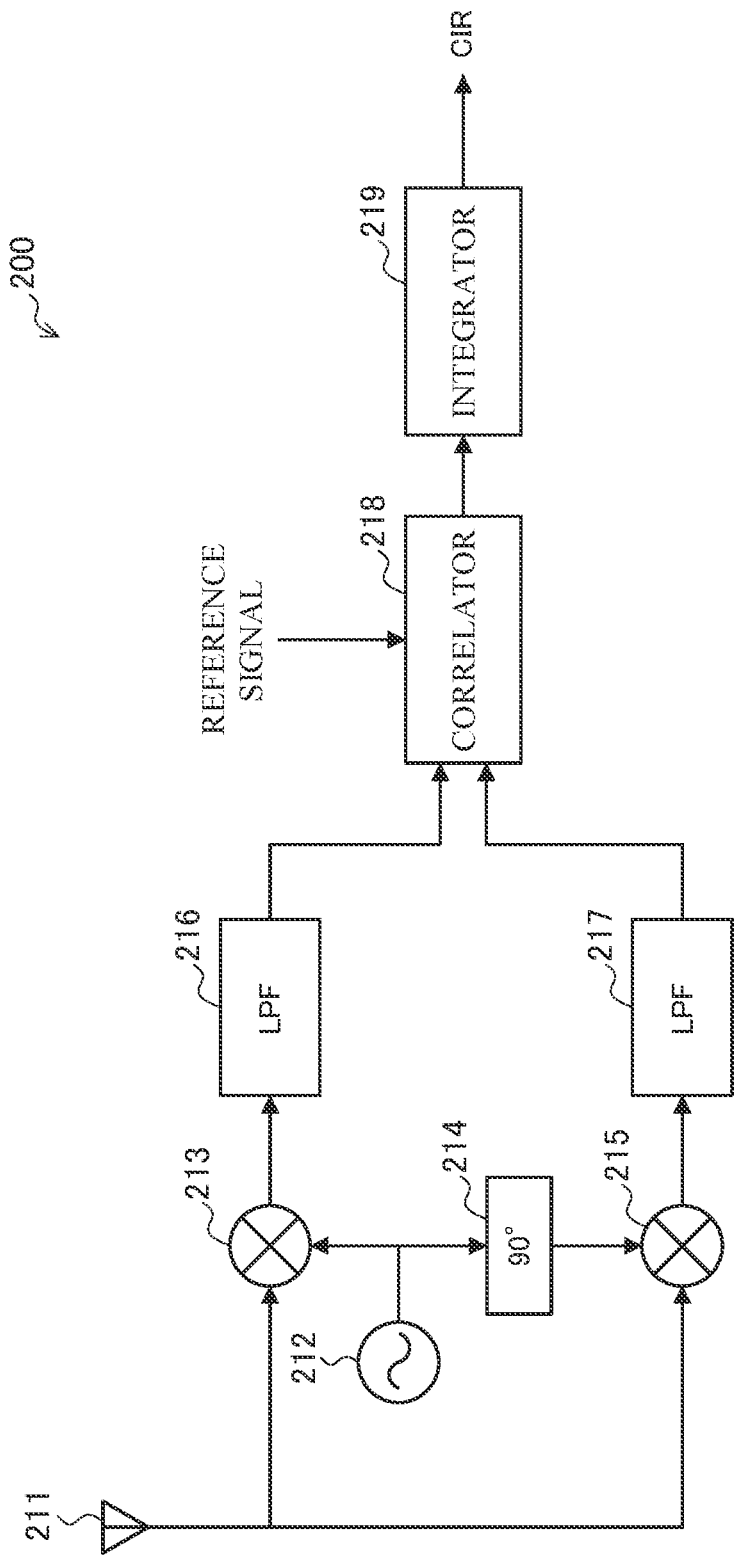
FIG. 5 is a diagram illustrating an example of processing blocks for a signal process in a communication unit according to the present embodiment.

FIG. 5 is a view illustrating an example of processing blocks for a signal process in the communication unit 200 according to the present embodiment. As illustrated in FIG. 5, the communication unit 200 includes an oscillator 212, a multiplier 213, a 90-degree phase shifter 214, a multiplier 215, a Low Pass Filter (LPF) 216, an LPF 217, a correlator 218, and an integrator 219.

The oscillator 212 generates a signal of a same frequency as a frequency of a carrier wave that carries a transmission signal, and outputs the generated signal to the multiplier 213 and the 90-degree phase shifter 214.

The multiplier 213 multiplies a reception signal received by the antenna 211 and the signal output from the oscillator 212, and outputs a result of the multiplication to the LPF 216. Among input signals, the LPF 216 outputs to the correlator 218 a signal of a frequency equal to or less than the frequency of the carrier wave that carries the transmission signal. The signal input to the correlator 218 is an I component (i.e., a real part) among components corresponding to an envelope of the reception signal.

The 90-degree phase shifter 214 delays the phase of the input signal by 90 degrees, and outputs the delayed signal to the multiplier 215. The multiplier 215 multiplies the reception signal received by the antenna 211 and the signal output from the 90-degree phase shifter 214, and outputs a result of the multiplication to the LPF 217. Among input signals, the LPF 217 outputs to the correlator 218 a signal of a frequency equal to or less than the frequency of the carrier wave that carries the transmission signal. The signal input to the correlator 218 is a Q component (i.e., an imaginary part) among the components corresponding to the envelope of the reception signal.

The correlator 218 calculates the CIR by sliding-correlating a reference signal with the reception signals including the I component and the Q component output from the LPF 216 and the LPF 217. Note that the reference signal described herein is the same signal as the transmission signal before multiplication of the carrier wave.

The integrator 219 integrates the CIRs output from the correlator 218, and outputs the integrated CIRs.

Here, the transmitter may transmit as the transmission signal a signal including a preamble including a plurality of one or more preamble symbols. The preamble is a sequence known between the transmitter and the receiver. Typically, the preamble is arranged at a head of the transmission signal. The preamble symbol is a pulse sequence including one or more pulses. The pulse sequence is a set of the plurality of pulses that are separated in the time direction. The preamble symbol is a target of integration performed by the integrator 219. Therefore, the correlator 218 calculates the CIR per preamble symbol by sliding-correlating the preamble symbol included in the transmission signal (i.e., reference signal) with respective portions corresponding to the plurality of preamble symbols included in the reception signal. Furthermore, the integrator 219 integrates the CIR of each preamble symbol for the one or more preamble symbols included in the preamble, and outputs integrated CIRs.

(2) Example of CIR

Figure 6:
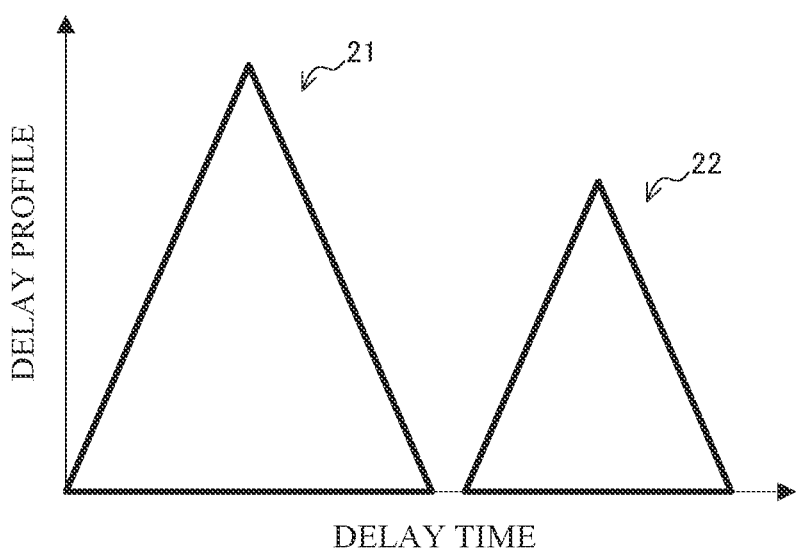
FIG. 6 is a graph illustrating an example of a CIR according to the present embodiment.

FIG. 6 illustrates an example of the CIR output from the integrator 219. FIG. 6 is a graph illustrating the example of the CIR according to the present embodiment. The CIR illustrated in FIG. 6 is a CIR in a case where a time at which the transmitter has transmitted the transmission signal is assumed as the count start time of the time counter. Such a CIR is also referred to as a delay profile. A horizontal axis of this graph indicates a delay time. The delay time is a time elapsed from the time at which the transmitter has transmitted the transmission signal. A vertical axis of this graph indicates absolute values of CIR values (e.g., an electric power value). Note that, hereinafter, description will be given assuming that the CIR refers to the delay profile.

The shape of a CIR, more specifically, the shape of a chronological change in the CIR value is also referred to as a CIR waveform. Typically, a set of elements between a zero crossing and a zero crossing in the CIR corresponds to one pulse. The zero crossing is an element whose value is zero. However, the same does not apply to an environment with noise. For example, a set of elements between intersections of a standard that serves as a criterion and a chronological change in the CIR value may be regarded as a set corresponding to the one pulse. The CIR illustrated in FIG. 6 includes a set 21 of elements corresponding to a certain pulse, and a set 22 of elements corresponding to another pulse.

The set 21 corresponds to, for example, a signal (e.g., pulse) that reaches the receiver through a fast path. The fast path refers to a shortest path between the transmitter and the receiver. In an environment without an obstacle, the fast path refers to a straight path between the transmitter and the receiver. For example, the set 22 corresponds to a signal (e.g., pulse) that reaches the receiver through a path other than the fast path. As described above, the signals that reach through a plurality of paths are also referred to as multipath waves.

(3) Detection of First Incoming Wave

The receiver detects a signal that satisfies a predetermined detection standard among wireless signals received from the transmitter as a signal that has reached the receiver through the fast path. Furthermore, the receiver estimates the positional parameters based on the detected signal. Hereinafter, the signal detected as the signal that has reached the receiver through the fast path is also referred to as a first incoming wave.

The receiver detects as the first incoming wave the signal that satisfies the predetermined detection standard among the received wireless signals. An example of the predetermined detection standard is that the CIR value (e.g., an amplitude or electric power) exceeds a predetermined threshold for the first time. That is, the receiver may detect as the first incoming wave a signal corresponding to a portion of the CIR whose CIR value exceeds the predetermined threshold for the first time. Hereinafter, the predetermined threshold used for detecting the first incoming wave is also referred to as a fast path threshold.

The signal received by the receiver may be any of a direct wave, a delayed wave, or a synthetic wave. The direct wave is a signal that is received by the receiver through a shortest path between the transmitter and the receiver. That is, the direct wave is a signal that reaches the receiver through the fast path. The delayed wave is a signal that reaches the receiver through a path that is not the shortest path between the transmitter and the receiver, that is, through a path other than the fast path. The delayed wave is received by the receiver after being delayed behind the direct wave. The synthetic wave is a signal received by the receiver in a state where a plurality of signals that have passed through a plurality of different paths are synthesized.

Here, it should be noted that the signal detected as the first incoming wave is not necessarily limited to the direct wave. For example, if the direct wave is received in a state where the direct wave and the delayed wave cancel each other, a CIR value of an element corresponding to the direct wave falls below the predetermined threshold, and the direct wave is not detected as the first incoming wave in some cases. In this case, the synthetic wave or the delayed wave coming after being delayed behind the direct wave is detected as the first incoming wave.

<2.3. Estimation of Positional Parameter>

(1) Distance Estimation

The communication unit 200 performs the ranging process. The ranging process is a process of estimating a distance between the communication unit 200 and the portable device 100. The distance between the communication unit 200 and the portable device 100 is, for example, the distance R illustrated in FIG. 3. The ranging process includes transmitting/receiving a ranging signal, and calculating the distance R based on a propagation delay time of the ranging signal. The propagation delay time is a time from transmission to reception of the signal.

Here, the one wireless communication section 210 of the plurality of wireless communication sections 210 of the communication unit 200 transmits/receives the ranging signal. Hereinafter, the wireless communication section 210 that transmits/receives the ranging signal is also referred to as a master. The distance R is a distance between the wireless communication section 210 functioning as the master (more precisely, the antenna 211) and the portable device 100.

In the ranging process, a plurality of the ranging signals may be transmitted and received between communication unit 200 and the portable device 100. Among the plurality of ranging signals, a ranging signal transmitted from one device to the other device is also referred to as a first ranging signal. Next, a ranging signal transmitted as a response to the first ranging signal from the device that has received the first ranging signal to the device that has transmitted the first ranging signal is also referred to as a second ranging signal. Next, a ranging signal transmitted as a response to the second ranging signal from the device that has received the second ranging signal to the device that has transmitted the second ranging signal is also referred to as a third ranging signal.

Next, an example of a flow of the ranging process will be described with reference to FIG. 7.

Figure 7:
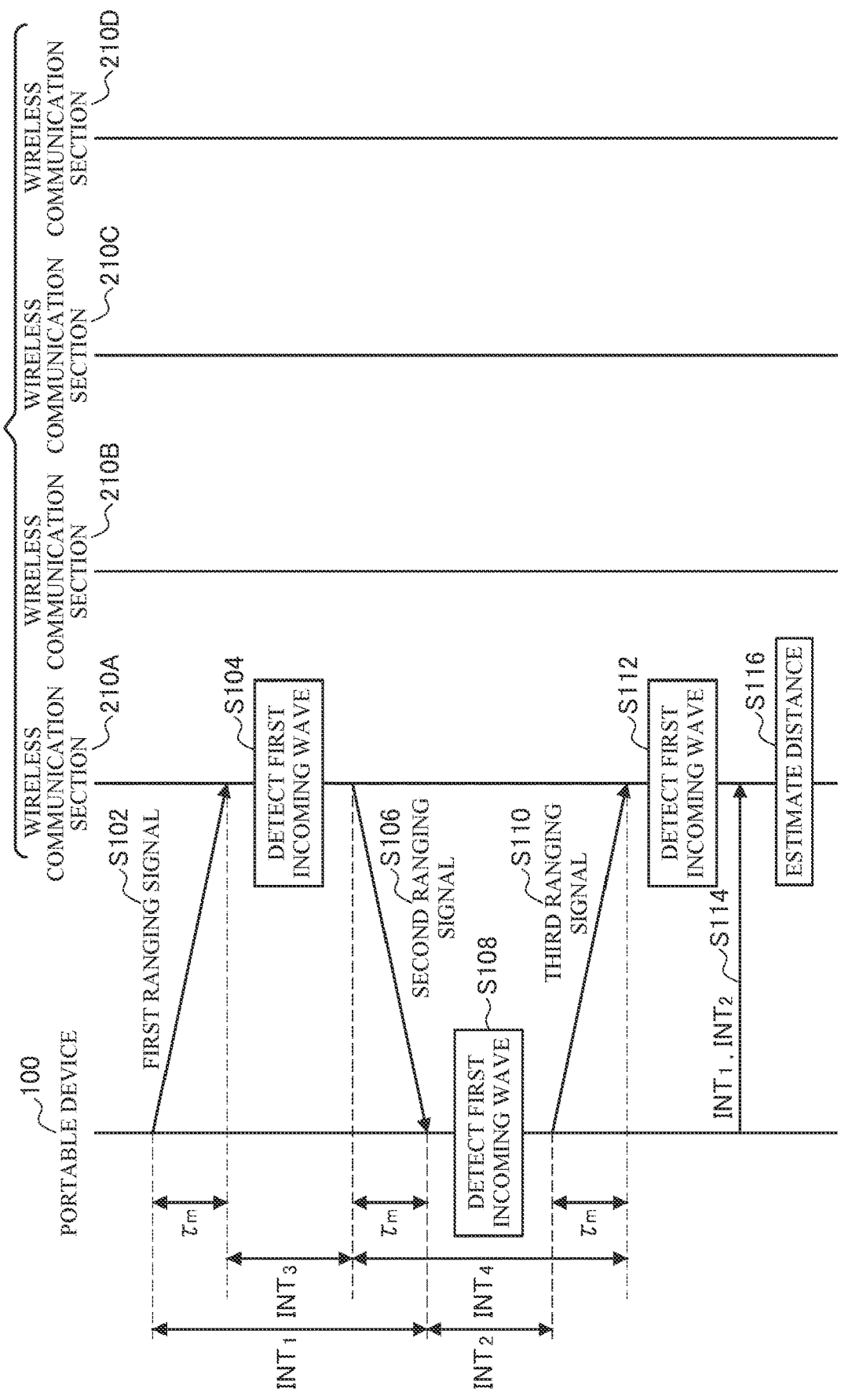
FIG. 7 is a sequence diagram illustrating an example of a flow of a ranging process executed by the system according to the present embodiment.

FIG. 7 is a sequence diagram illustrating the example of the flow of the ranging process executed by the system 1 according to the present embodiment. The portable device 100 and the communication unit 200 are involved in this sequence. It is assumed that the wireless communication section 210A functions as the master in this sequence.

As illustrated in FIG. 7, the portable device 100 first transmits the first ranging signal (step S102). When the wireless communication section 210A receives the first ranging signal, the control section 230 calculates a CIR of the first ranging signal. Subsequently, the control section 230 detects a first incoming wave of the first ranging signal of the wireless communication section 210A based on the calculated CIR (step S104).

Next, the wireless communication section 210A transmits the second ranging signal as a response to the first ranging signal (step S106). When receiving the second ranging signal, the portable device 100 calculates a CIR of the second ranging signal. Subsequently, the portable device 100 detects a first incoming wave of the second ranging signal based on the calculated CIR (step S108).

Next, the portable device 100 transmits the third ranging signal as a response to the second ranging signal (step S110). When the wireless communication section 210A receives the third ranging signal, the control section 230 calculates a CIR of the third ranging signal. Subsequently, the control section 230 detects a first incoming wave of the third ranging signal of the wireless communication section 210A based on the calculated CIR (step S112).

The portable device 100 measures an interval $INT_1$ from a transmission time of the first ranging signal to a reception time of the second ranging signal, and an interval $INT_2$ from a reception time of the second ranging signal to a transmission time of the third ranging signal. Here, the reception time of the second ranging signal is a reception time of the first incoming wave of the second ranging signal detected in step S108. Furthermore, the portable device 100 transmits a signal including information indicating the intervals $INT_1$ and $INT_2$ (step S114). Such a signal is received by, for example, the wireless communication section 210A.

The control section 230 measures an interval $INT_3$ from a reception time of the first ranging signal to a transmission time of the second ranging signal, and an interval $INT_4$ from a transmission time of the second ranging signal to a reception time of the third ranging signal. Here, the reception time of the first ranging signal is a reception time of the first incoming wave of the first ranging signal detected in step S104. Similarly, the reception time of the third ranging signal is a reception time of the first incoming wave of the third ranging signal detected in step S112.

Furthermore, the control section 230 estimates the distance R based on the intervals $INT_1$, $INT_2$, $INT_3$, and $INT_4$ (step S116). For example, the control section 230 estimates a propagation delay time $\tau_m$ by a following equation.

[Mathematical 1]

$$\tau_m = \frac{INT_1 \times INT_4 - INT_2 \times INT_3}{INT_1 + INT_2 + INT_3 + INT_4} \quad (1)$$

Subsequently, the control section 230 estimates the distance R by multiplying the estimated propagation delay time $\tau_m$ with a speed of the signal.

Cause of Decrease in Estimation Accuracy

The reception times of the ranging signals serving as start or end of the intervals $INT_1$, $INT_2$, $INT_3$, and $INT_4$ are reception times of the first incoming waves of the ranging signals. As described above, the signal detected as the first incoming wave is not necessarily limited to the direct wave.

In the case where the synthetic wave or the delayed wave coming after being delayed behind the direct wave is detected as the first incoming wave, a reception time of the first incoming wave is delayed compared to the case where the direct wave is detected as the first incoming wave. In this case, an estimation result of the propagation delay time $\tau_m$ fluctuates from a true value (an estimation result in the case where the direct wave is detected as the first incoming wave). Furthermore, this fluctuation lowers the ranging accuracy.

Supplement

Note that the receiver may regard as the reception time of the first incoming wave the time at which the predetermined detection standard is satisfied. That is, the receiver may regard a time at which the electric power value of the CIR exceeds the predetermined threshold for the first time, or a time at which the reception electric power value of the received wireless signal exceeds the predetermined threshold for the first time, as the reception time of the first incoming wave. In addition, the receiver may regard a time of a peak of the detected first incoming wave (i.e., a time at which the electric power value is the highest at a portion of the CIR corresponding to the first incoming wave, or a time at which the reception electric power value is the highest in the first incoming wave), as the reception time of the first incoming wave.

(2) Angle Estimation

The communication unit 200 performs the angle estimation process. The angle estimation process is a process of estimating the angles $\alpha$ and $\beta$ illustrated in FIG. 3. The angle estimation process includes receiving an angle estimation signal, and calculating the angles $\alpha$ and $\beta$ based on a reception result of the angle estimation signal. The angle estimation signal is a signal transmitted and received by the angle estimation process. Next, an example of a flow of the angle estimation process will be described with reference to FIG. 8.

Figure 8:
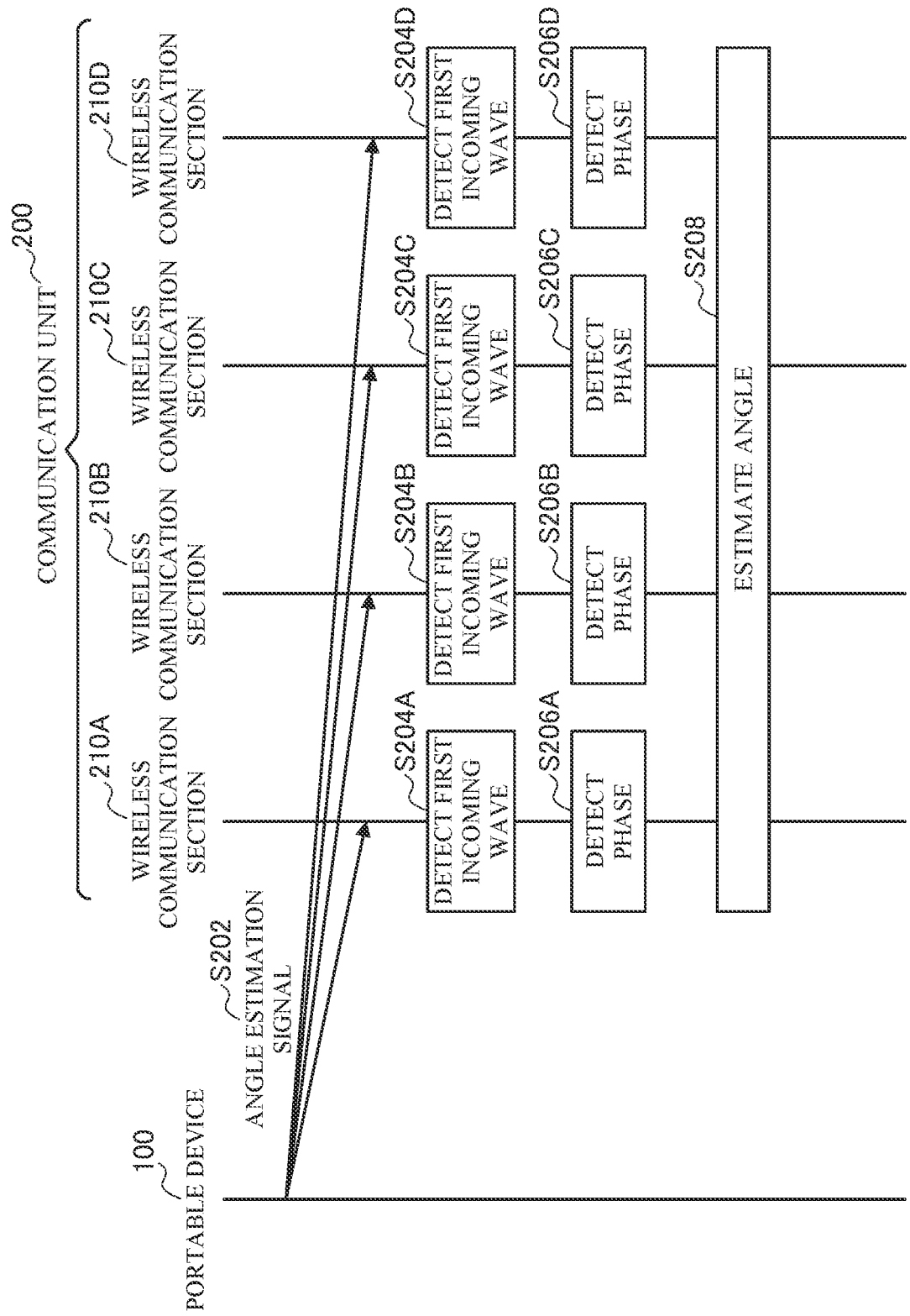
FIG. 8 is a sequence diagram illustrating an example of a flow of an angle estimation process executed by the system according to the present embodiment.

FIG. 8 is a sequence diagram illustrating the example of the flow of the angle estimation process executed by the system 1 according to the present embodiment. The portable device 100 and the communication unit 200 are involved in this sequence.

As illustrated in FIG. 8, the portable device 100 first transmits the angle estimation signal (step S202). Next, when the wireless communication sections 210A to 210D respectively receive angle estimation signals, the control section 230 calculates CIRs of the angle estimation signals respectively received by the wireless communication sections 210A to 210D. Subsequently, the control section 230 detects first incoming waves of the angle estimation signals based on the calculated CIRs for the respective wireless communication sections 210A to 210D (steps S204A to S204D). Next, the control section 230 detects phases of the detected first incoming waves for the respective wireless communication sections 210A to 210D (steps S206A to S206D). Furthermore, the control section 230 estimates the angles $\alpha$ and $\beta$ based on the phases of the detected first incoming waves detected for the respective wireless communication sections 210A to 210D (step S208).

Here, the phase of the first incoming wave may be a phase at the reception time of the first incoming wave among the CIRs. In addition, the phase of the first incoming wave may be a phase at the reception time of the first incoming wave among the received wireless signals.

Next, details of a process in step S208 will be described. PA represents the phase of the first incoming wave detected for the wireless communication section 210A. PB represents the phase of the first incoming wave detected for the wireless communication section 210B. Pc represents the phase of the first incoming wave detected for the wireless communication section 210C. PD represents the phase of the first incoming wave detected for the wireless communication section 210D. In this case, antenna array phase differences $Pd_{AC}$ and $Pd_{BD}$ in the X axis direction and antenna array phase differences $Pd_{BA}$ and $Pd_{DC}$ in the Y axis direction are respectively expressed by following equations.

[Mathematical 2]

$$Pd_{AC} = (P_A - P_C) \quad (2)$$
$$Pd_{BD} = (P_B - P_D)$$
$$Pd_{DC} = (P_D - P_C)$$
$$Pd_{BA} = (P_B - P_A)$$

The angles $\alpha$ and $\beta$ are calculated by using following equations. Here, $\lambda$ represents a wavelength of a radio wave, and d represents a distance between the antennas 211.

[Mathematical 3]

$$\alpha \text{ or } \beta = \arccos(\lambda \cdot Pd/(\lambda \cdot \pi \cdot d)) \quad (3)$$

Therefore, angles calculated based on the respective antenna array phase differences are respectively expressed by following equations.

[Mathematical 4]

$$\alpha_{AC} = \arccos(\lambda \cdot Pd_{AC}/(2 \cdot \pi \cdot d)) \quad (4)$$
$$\alpha_{BD} = \arccos(\lambda \cdot Pd_{BD}/(2 \cdot \pi \cdot d))$$
$$\beta_{DC} = \arccos(\lambda \cdot Pd_{DC}/(2 \cdot \pi \cdot d))$$
$$\beta_{BA} = \arccos(\lambda \cdot Pd_{BA}/(2 \cdot \pi \cdot d))$$

The control section 230 calculates the angles $\alpha$ and $\beta$ based on the above calculated angles $\alpha_{AC}$, $\alpha_{BD}$, $\beta_{DC}$, and $\beta_{BA}$. For example, as expressed by the following equations, the control section 230 calculates the angles $\alpha$ and $\beta$ by averaging the angles calculated for the two respective arrays in the X axis and Y axis directions.

[Mathematical 5]

$$\alpha = (\alpha_{AC} + \alpha_{BD})/2$$

$$\beta = (\beta_{DC} + \beta_{BA})/2 \quad (5)$$

Cause of Decrease in Estimation Accuracy

As described above, the angles $\alpha$ and $\beta$ are calculated based on the phases of the first incoming waves. As described above, the signal detected as the first incoming wave is not necessarily limited to the direct wave.

That is, the delayed wave or the synthetic wave may be detected as the first incoming wave in some cases. Typically, phases of the delayed wave and the synthetic wave are different from the phase of the direct wave. Therefore, this difference lowers angle estimation accuracy.

Supplement

Note that the angle estimation signal may be the same as the ranging signal. For example, the third ranging signal illustrated in FIG. 7 may be the same as the angle estimation signal illustrated in FIG. 8. In this case, the communication unit 200 can calculate the distance R and the angles α and β by receiving one wireless signal that serves as both the angle estimation signal and the second ranging signal.

(3) Coordinate Estimation

The control section 230 performs a coordinate estimation process. The coordinate estimation process is a process of estimating three-dimensional coordinates (x, y, z) of the portable device 100 illustrated in FIG. 4. As the coordinate estimation process, a following first calculation method and second calculation method may be adopted.

First Calculation Method

The first calculation method is a method for calculating the coordinates x, y, and z based on results of the ranging process and the angle estimation process. In this case, the control section 230 first calculates the coordinates x and y by following equations.

[Mathematical 6]

$$x = R \cdot \cos \alpha$$
$$y = R \cdot \cos \beta \quad (6)$$

Here, a relation of a following equation holds for the distance R and the coordinates x, y, and z.

[Mathematical 7]

$$R = \sqrt{x^2 + y^2 + z^2} \quad (7)$$

The control section 230 calculates the coordinate z by using the above relation and a following equation.

[Mathematical 8]

$$z = \sqrt{R^2 - R^2 \cdot \cos^2 \alpha - R \cdot \cos^2 \beta} \quad (8)$$

Second Calculation Method

The second calculation method is a method for calculating the coordinates x, y, and z while omitting estimation of the angles α and β. First, the above equations (4), (5), (6), and (7) establish a relation of following equations.

[Mathematical 9]

$$x/R = \cos \alpha \quad (9)$$

[Mathematical 10]

$$y/R = \cos \beta \quad (10)$$

[Mathematical 11]

$$x^2 + y^2 + z^2 = R^2 \quad (11)$$

[Mathematical 12]

$$d \cdot \cos \alpha = \lambda \cdot (Pd_{AC}/2 + Pd_{BD}/2)/(2 \cdot \pi) \quad (12)$$

[Mathematical 13]

$$d \cdot \cos \beta = \lambda \cdot (Pd_{DC}/2 + Pd_{BA}/2)/(2 \cdot \pi) \quad (13)$$

By rearranging the equation (12) for cos α, and substituting the equation (12) into the equation (9), it possible to obtain the coordinate x by a following equation.

[Mathematical 14]

$$x = R \cdot \lambda \cdot (Pd_{AC}/2 + Pd_{BD}/2)/(\lambda \cdot \pi \cdot d) \quad (14)$$

By rearranging the equation (13) for cos β, and substituting the equation (13) into the equation (10), it possible to obtain the coordinate y by a following equation.

[Mathematical 15]

$$y = R \cdot \lambda \cdot (Pd_{DC}/2 + Pd_{BA}/2)/(2 \cdot \pi \cdot d) \quad (15)$$

Furthermore, by substituting the equation (14) and the equation (15) into the equation (11), and rearranging these equations, it possible to obtain the coordinate z by a following equation.

[Mathematical 16]

$$z = \sqrt{R^2 - x^2 - y^2} \quad (16)$$

The process of estimating the coordinates of the portable device 100 in the local coordinate system has been described above. By combining the coordinates of the portable device 100 in the local coordinate system and coordinates of the origin of the local coordinate system in the global coordinate system, it is possible to estimate coordinates of the portable device 100 in the global coordinate system, too.

Cause of Decrease in Estimation Accuracy

As described above, the coordinates are calculated based on the propagation delay time and phases. Furthermore, the propagation delay time and the phases are both estimated based on the first incoming waves. Therefore, coordinate estimation accuracy may lower for a similar reason to the ranging process and the angle estimation process.

(4) Estimation of Existence Area

The positional parameters may include an area in which the portable device 100 exists among a plurality of predefined areas. For example, in the case where the area is defined based on a distance from the communication unit 200, the control section 230 estimates the area in which the portable device 100 exists based on the distance R estimated by the ranging process. For another example, in the case where the area is defined based on an angle with respect to the communication unit 200, the control section 230 estimates the area in which the portable device 100 exists based on the angles α and β estimated by the angle estimation process. For another example, in the case where the area is defined by the three-dimensional coordinates, the control section 230 estimates the area in which the portable device 100 exists based on the coordinates (x, y, z) estimated by the coordinate estimation process.

In addition, in a process unique to the vehicle 202, the control section 230 may estimate the area in which the portable device 100 exists among the plurality of areas including the interior of the vehicle compartment and the exterior of the vehicle compartment of the vehicle 202. This makes it possible to provide courteous service such as service of providing different services in the case where the user is inside the vehicle compartment and in the case where the user is outside the vehicle compartment. Furthermore, the control section 230 may specify the area in which the portable device 100 exists among a surrounding area that is an area within a predetermined distance from the vehicle 202, and a distant area that is the predetermined distance or more away from the vehicle 202.

(5) Use of Estimation Result of Positional Parameter

For example, an estimation result of the positional parameter may be used for authentication of the portable device 100. For example, the control section 230 decides that the authentication is successful and unlocks a door in the case where the portable device 100 exists in an area that is on a driver seat side and at a close distance from the communication unit 200.

3. Technical Problem

The technical problems of the present embodiment will be described with reference to FIGS. 9 to 12. FIGS. 9 to 12 are graphs for describing the technical problems of the present embodiment. A horizontal axis indicates a chip length that indicates the delay time, and a vertical axis indicates absolute values of CIR values (e.g., electric power values). The chip length is a duration per pulse. For example, in the case where a pulse with a bandwidth of 500 MHz is formed, the chip length is a pulse width of approximately 2 ns.

Figure 9:
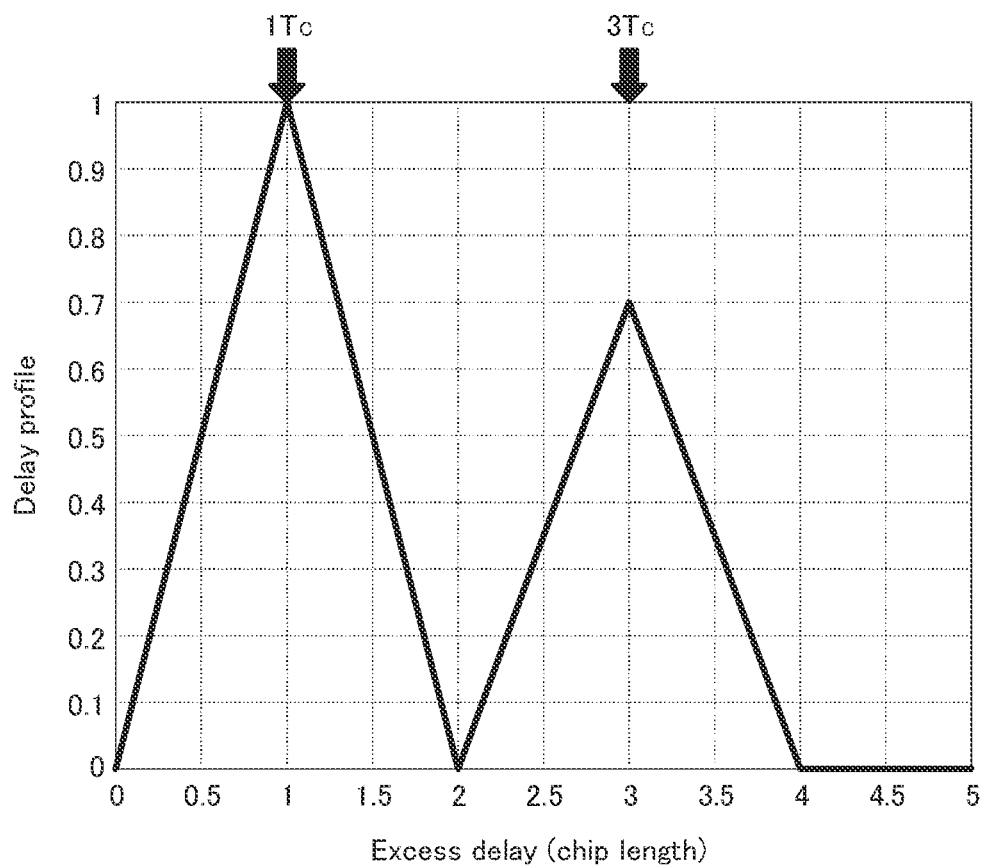
FIG. 9 is a graph for describing a technical problem of the present embodiment.

FIG. 9 illustrates a CIR in the case where a signal having passed through a fast path arrives at a delay time 1 $T_C$, and a signal having passed through a path other than the fast path arrives at a delay time 3 $T_C$. Referring to FIG. 9, the CIR waveform includes peaks at the respective delay times 1 $T_C$ and 3 $T_C$. Accordingly, it is found that this CIR waveform sufficiently achieves separation of two multipath waves whose delay times are different by 2 $T_C$.

Figure 10:
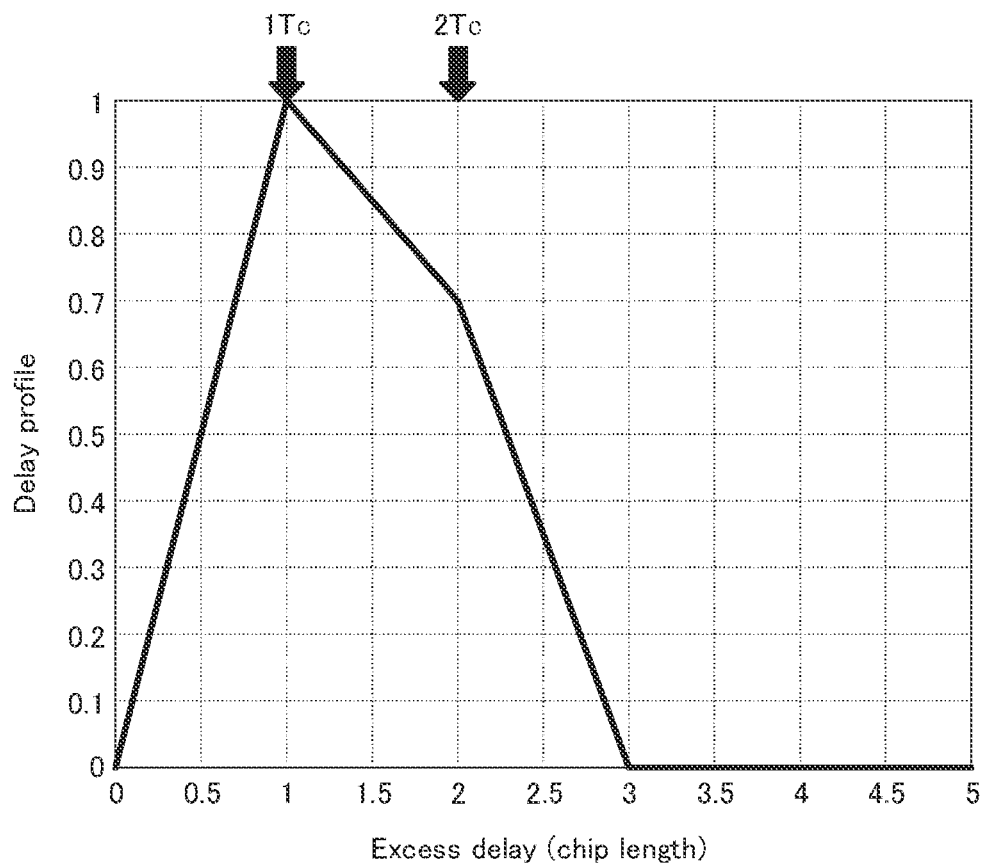
FIG. 10 is a graph for describing a technical problem of the present embodiment.

FIG. 10 illustrates a CIR in the case where a signal having passed through a fast path arrives at a delay time 1 $T_C$, and a signal having passed through a path other than the fast path arrives at a delay time 2 $T_C$. Note that a signal of a first wave arriving at the delay time 1 $T_C$ and a signal of a second wave arriving at the delay time 2 $T_C$ have the same phase. Reference to FIG. 10, while the CIR waveform includes a peak at the delay time 1 $T_C$, the CIR waveform does not include a peak at the delay time 2 $T_C$. Furthermore, the signal arriving at the delay time 1 $T_C$ and the signal arriving at the delay time 2 $T_C$ are synthesized in the same phase, and appear as one waveform. Accordingly, it is found that this CIR waveform has difficulty in separating two multipath waves whose delay times are different by 1 $T_C$.

Figure 11:
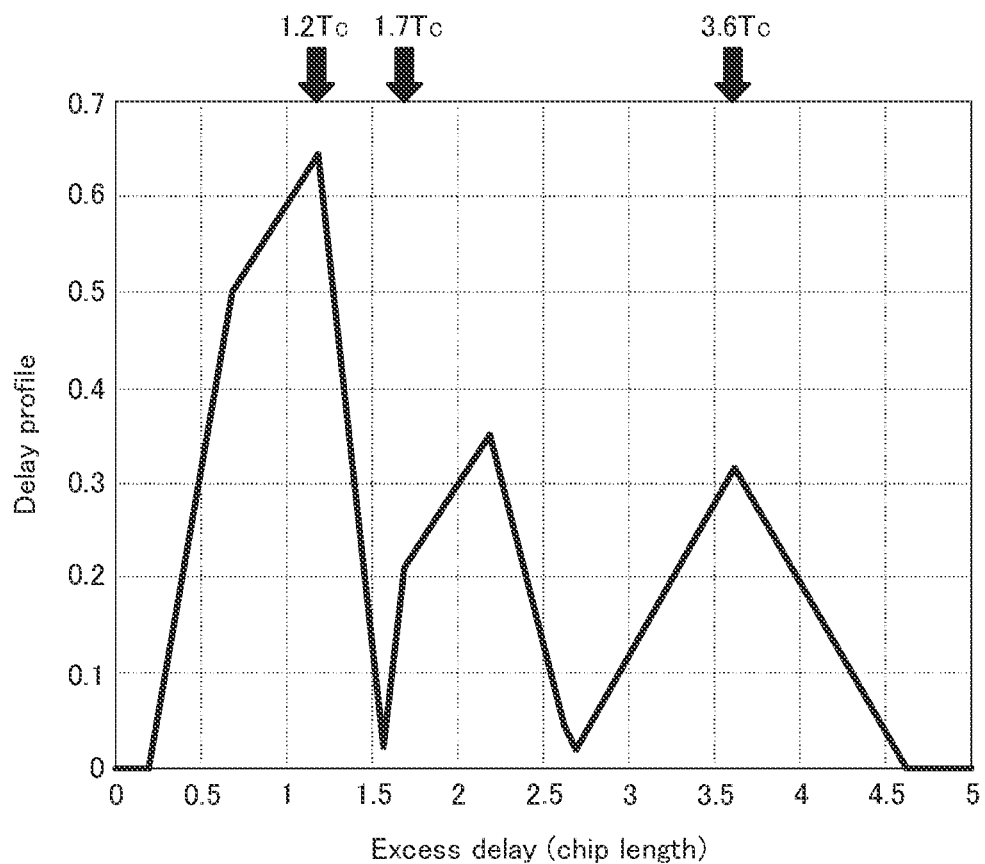
FIG. 11 is a graph for describing a technical problem of the present embodiment.

FIG. 11 illustrates a CIR in the case where a signal having passed through a fast path arrives at a delay time 1.2 $T_C$, and signals having passed through paths other than the fast path arrive at delay times 1.7 $T_C$ and 3.6 $T_C$. Note that a signal of a first wave arriving at the delay time 1.2 $T_C$ and a signal of a second wave arriving at the delay time 1.7 $T_C$ have reverse phases. Referring to FIG. 11, the CIR waveform includes peaks at the delay times 1.2 $T_C$ and 3.6 $T_C$. On the other hand, there is a second peak near a delay time 2.2 $T_C$. This second peak significantly deviates from a true delay time 1.7 $T_C$. Accordingly, it is found that this CIR waveform has difficulty in separating two multipath waves whose delay times are different by 0.5 $T_C$.

In the case where a difference between the delay times of the two multipath waves arriving at the receiver is short as illustrated in FIGS. 10 and 11, the delay time at which there is a peak in the CIR waveform may fluctuate from an original delay time. Therefore, a delay time detected as the reception time of the first incoming wave may fluctuate from the original delay time.

In this case, this fluctuation lowers the ranging accuracy.

Figure 12:
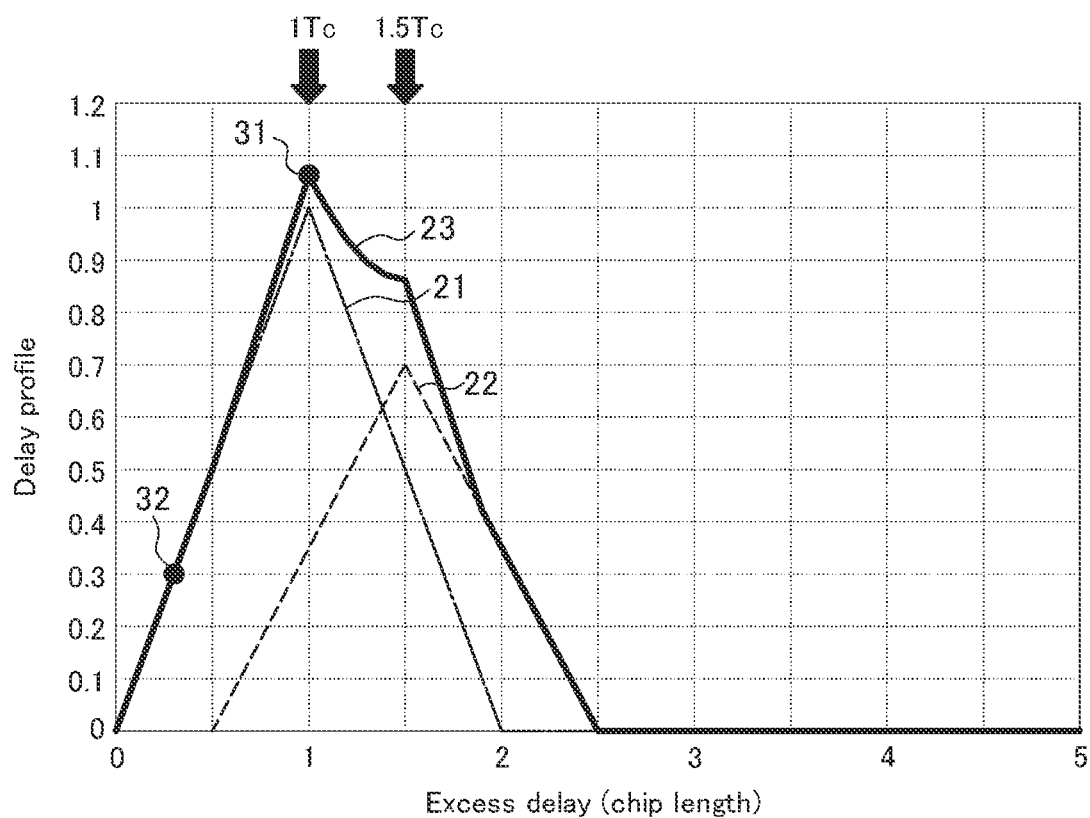
FIG. 12 is a graph for describing a technical problem of the present embodiment.

FIG. 12 illustrates a CIR waveform 23 in the case where a signal having passed through a fast path arrives at a delay time 1 $T_C$, and a signal having passed through a path other than the fast path arrives at a delay time 1.5 $T_C$. A CIR waveform 21 is a CIR waveform in the case where a signal having passed through a fast path is received alone at the delay time 1 $T_C$. A CIR waveform 22 is a CIR waveform in the case where a signal having passed through a path other than the fast path is received alone at the delay time 1.5 $T_C$. Note that a phase of a signal of a first wave arriving at the delay time 1 $T_C$ and a phase of a signal of a second wave arriving at the delay time 2 $T_C$ are shifted by 90 degrees.

In the case where the difference between the delay times of the two multipath waves arriving at the receiver is short, the delayed wave or the synthetic wave is detected as the first incoming wave in some cases.

In the example illustrated in FIG. 12, the synthetic wave is detected as the first incoming wave. Typically, phases of the delayed wave and the synthetic wave are different from the phase of the direct wave. Therefore, this difference lowers angle estimation accuracy.

In the case where the synthetic wave of the direct wave and the delayed wave is detected as the first incoming wave as illustrated in the example in FIG. 12, the delayed wave is synthesized and thereby a phase significantly fluctuates at a sampling point 31 near a peak. Accordingly, when an angle is estimated based on the phase of the sampling point 31, estimation accuracy lowers.

On the other hand, the delayed wave is less influential at a sampling point with lower electric power before the peak such as a sampling point 32, and therefore the phase fluctuates less. However, the electric power value lowers in exchange for reduction of the influence of the delayed wave, and therefore an influence of noise increases, and this decease lowers the estimation accuracy.

Therefore, it is desirable to separate the multipath waves with higher resolution than the CIR.

4. Technical Features

<4.1 Detection of First Incoming Wave>

The portable device 100 and the communication unit 200 detect the first incoming wave by a process to be described in detail below. Hereinafter, for example, a case where a main component that detects the first incoming wave is the communication unit 200 will be described. The process to be described below may be executed by the portable device 100.

(1) Formulation of Delay Profile

First, the delay profile (i.e., CIR) is formulated by a Pseudo-Noise (PN) correlation method. The PN correlation method is a method for calculating a CIR by transmitting a signal including a random sequence such as a PN sequence signal shared between the transmitter and the receiver, and sliding-correlating a transmission signal with a reception signal. Note that the PN sequence signal is a signal including substantially randomly arranged 1 and 0.

Hereinafter, it is assumed that a PN sequence signal u(t) of a unit amplitude is transmitted as the transmission signal (e.g., preamble symbols of a ranging signal and an angle estimation signal). The unit amplitude is a designated amplitude known between the transmitter and the receiver.

Furthermore, hereinafter, it is assumed that an antenna of the receiver receives multipath waves of an L wave as signals corresponding to a transmission signal transmitted from the transmitter. The multipath waves are signals that pass through a plurality of paths and are received by the receiver. That is, when the transmitter transmits the one signal, the receiver receives L signals having passed through the plurality of paths.

In this case, the reception signal x(t) is expressed by a following equation.

[Mathematical 17]

$$x(t) = \sum_{i=1}^{L} h_i u(t - T_{0i}) e^{-j2\pi f T_{0i}} + v(t) \qquad (17)$$

Here, t represents a time. $h_i$ represents a complex response value of an i-th multipath wave. $T_{0i}$ represents a propagation delay time of the i-th multipath wave. f represents a frequency of a carrier wave of the transmission signal. v(t) represents internal noise. The internal noise is noise caused inside a circuit of the receiver.

For example, as expressed in a following equation, the reception signal x(t) is correlated with a transmission signal u(t) known by the receiver by the PN correlation method by shifting a time of the transmission signal u(t).

[Mathematical 18]

$$z(\tau) = \frac{1}{T}\int_0^T u^*(t-\tau)x(t)dt \quad (18)$$

Note that u*( ) represents a complex conjugate of u( ) z(t) is also referred to as the delay profile. Furthermore, $|z(\tau)|^2$ is also referred to as a power delay profile. τ represents a delay time.

The delay profile in a case where the multipath waves of the L wave are received is expressed by a following equation.

[Mathematical 19]

$$z(\tau) = \sum_{i=1}^{L} h_i e^{-j2\pi fT_{0i}} r(\tau - T_{0i}) + n(\tau) \quad (19)$$

Here, r(τ) represents an autocorrelation function of the PN sequence signal. The autocorrelation function is a function of correlating a signal with the signal itself. r(τ) is given by a following equation.

[Mathematical 20]

$$r(\tau) = \frac{1}{T}\int_0^T u^*(t-\tau)u(t)dt \quad (20)$$

Furthermore, n(τ) represents an internal noise component. n(τ) is given by a following equation.

[Mathematical 21]

$$n(\tau) = \int_0^T u^*(t-\tau)v(t)dt \quad (21)$$

(2) Sparse Reconstruction

The number of times of sampling of the reception signal is M (where M>L holds). Furthermore, it is assumed that the reception signal is sampled at M discrete delay times $\tau_1$, $\tau_2$, ..., and $\tau_M$. Note that the discrete delay times refer to delay times expressed as discrete values. z(τ) represents the delay profile calculated based on the reception signal sampled at the discrete delay time τ. A data vector z including the M delay profiles is expressed by a following equation. Note that the following equation is an equation in a case where the receiver receives only one preamble symbol.

[Mathematical 22]

$$z=[z(\tau_1),z(\tau_2),\ldots,z(\tau_M)]^T \quad (22)$$

In the case where the multipath waves of the L wave are received, the data vector z is expressed by following equations.

[Mathematical 23]

$$z = \sum_{i=1}^{L} h_i e^{-j2\pi fT_{0i}} r(T_{0i}) + n \quad (23)$$

[Mathematical 24]

$$r(\tau)=[r(\tau_1-\tau),r(\tau_2-\tau),\ldots,r(\tau_M-\tau)] \quad (24)$$

[Mathematical 25]

$$n=[n(\tau_1),n(\tau_2),\ldots,n(\tau_M)] \quad (25)$$

Note that r(τ) is referred to as a modal vector.
Furthermore, matrix expression of the data vector z is expressed by following equations.

[Mathematical 26]

$$z=A_0 s_0+n\in \mathbb{C}^M \quad (26)$$

[Mathematical 27]

$$A_0=[r(T_{01}),r(T_{02}),\ldots,(T_{0L})]\in \mathbb{C}^{M\times L} \quad (27)$$

[Mathematical 28]

$$s_0=[h_1 e^{-j2\pi fT_{01}},h_2 e^{-j2\pi fT_{02}},\ldots,h_L e^{-j2\pi fT_{0L}}]^T\in \mathbb{C}^L \quad (28)$$

Here, $A_0$ is also referred to as a modal matrix.
Furthermore, $S_0$ is also referred to as a signal vector.
According to sparse reconstruction, the data vector z is converted into a format including a matrix product of A and s.

[Mathematical 29]

$$z=As+n\in \mathbb{C}^M \quad (29)$$

[Mathematical 30]

$$A=[r(T_1),r(T_2),\ldots,r(T_N)]\in \mathbb{C}^{M\times N} \quad (30)$$

[Mathematical 31]

$$s=[s_1,s_2,\ldots,s_N]^T\in \mathbb{C}^N \quad (31)$$

$T_1, T_2, \ldots$, and $T_N$ represent N delay times to be searched. $T_1, T_2, \ldots$, and $T_N$ are also referred to as delay time bins. A delay time bin is an example of a set time. Note that N>>L holds.

Here, A is also referred to as an expanded modal matrix. The expanded modal matrix is a matrix including a plurality of elements indicating the delay profile in a case where it is assumed that signals are received in a plurality of respective delay time bins. For example, $r(T_1)$ that is an element of the expanded modal matrix A is a delay profile of a signal in a case where it is assumed that the signal is received at the time $T_1$.

Furthermore, s is also referred to as an expanded signal vector. The expanded signal vector is a vector including a plurality of elements each indicating whether or not there is a signal per delay time bin, and an amplitude and a phase of the signal.

(3) Estimation of Propagation Delay Time Based on Expanded Signal Vector

According to sparse reconstruction, a delay profile z is modeled in a form of As+n. Consequently, it is possible to find the expanded signal vector s by solving an underdetermined problem where an unknown number is N and a condition number is M (where M<N holds). The control section 230 estimates a reception time of the first incoming wave based on the delay time bins corresponding to the plurality of elements of the expanded signal vector s.

Here, nonzero elements of the expanded signal vector indicate that there are signals in the delay time bins corresponding to the nonzero elements. On the other hand, zero elements of the expanded signal vector indicate that there is no signal in the delay time bins corresponding to the zero elements. Therefore, the control section 230 estimates as a reception time of the first incoming wave the delay time bin corresponding to the nonzero element among the delay time bins corresponding to the plurality of elements of the expanded signal vector s.

At this time, the control section 230 estimates a sparse solution of the expanded signal vector s, and estimates the delay time bin corresponding to the nonzero element of the estimated sparse solution as a reception time of the first incoming wave. The sparse solution is a vector whose predetermined number of elements are nonzero elements. The predetermined number is a number of pulses included in the reception signal as pulses corresponding to the one pulse included in the transmission signal. That is, the sparse solution is a vector whose only L elements are nonzero elements and whose other elements are zero elements in the case where the multipath waves of the L wave are received. For example, in the case where $s_2$ is the nonzero element in $s=[s_1, s_2, \ldots, s_N]$, it is decided that a signal is received at the delay time $T_2$.

In particular, the control section 230 estimates as a reception time of the first incoming wave an earliest delay time bin among the delay time bins corresponding to nonzero elements of the elements included in the expanded signal vector s. For example, in the case where $s_2$ $s_4$, and $s_6$ are the nonzero elements among $s=[s_1, s_2, \ldots, s_N]$, it is decided that a signal having passed through a fast path is received at the delay time $T_2$, and signals having passed through paths other than the fast path are received at the delay times $T_4$ and $T_6$.

Resolution of the signal found by a model subjected to sparse reconstruction is determined based on a number of N (i.e., the number of elements of the expanded signal vector s) used for modelling in the sparse reconstruction. Therefore, by increasing the number of N at the time of the sparse reconstruction, it is possible to separate the multipath waves with resolution finer than the CIR. Accordingly, in the present embodiment, the number N of the delay time bins is made larger than the number of times of sampling M of the reception signal. In other words, in the present embodiment, time intervals between the N delay time bins $T_1, T_2, \ldots,$ and $T_N$ are shorter than time intervals between the M discrete delay times $T_1, T_2, \ldots,$ and $T_M$. Such a configuration makes it possible to separate the multipath waves with resolution finer than the sampling intervals of the reception signal. As a result, it is possible to find the reception time of the first incoming wave with the resolution finer than the CIR.

(4) Compression Sensing Algorithm

The control section 230 estimates the expanded signal vector s that is the sparse solution by using a compression sensing algorithm. The compression sensing algorithm is an algorithm for assuming that an unknown vector is a sparse vector, and estimating the unknown vector based on linear observation of the unknown vector. According to the present embodiment, the expanded signal vector s is an example of the unknown vector. The linear observation refers to obtaining a result obtained by multiplying the unknown vector with a coefficient. According to the present embodiment, the expanded modal matrix A is an example of the coefficient. The delay profile z is an example of the linear observation.

Examples of the compression sensing algorithm include a FOcal Underdetermined System Solver (FOCUSS), an Iterative Shrinkage/Thresholding Algorithm (ISTA), a Fast ISTA (FISTA), and the like. In particular, the FOCUSS is an algorithm for assuming an initial value of the unknown vector, and iteratively estimating the unknown vector using a generalized inverse matrix and a weighing matrix. The FOCUSS makes it possible to accurately estimate the unknown vector with a small number of times of iteration by using the generalized inverse matrix and the weighting matrix. Details of a basic principle of the FOCUSS are described in a first non-patent document "Irina F. Gorodnitsky, Member, IEEE, and Bhaskar D. Rao, "Sparse Signal Reconstruction from Limited Data Using FOCUSS: A Reweighted Minimum Norm Algorithm", IEEE TRANSACTIONS ON SIGNAL PROCESSING, VOL. 45, NO. 3, March 1997".

Another example of the compression sensing algorithm includes the FOCUSS with multiple measurement vectors (M-FOCUSS) enhanced from the above-described FOCUSS. The M-FOCUSS is an algorithm for applying the FOCUSS to a plurality of unknown vectors in parallel. Details of a basic principle of the M-FOCUSS are described in a second non-patent document "Shane F. Cotter, et al; "Sparse Solutions to Linear Inverse Problems With Multiple Measurement Vectors", IEEE Transactions on Signal Processing, vol. 53, No. 7, July 2005, pp. 2477-2488".

The control section 230 according to the present embodiment estimates a reception time of the first incoming wave by using the M-FOCUSS. Therefore, the control section 230 first performs sparse reconstruction to enable use of the M-FOCUSS. Specifically, the control section 230 converts a data matrix obtained by expanding the data vector z for the plurality of wireless communication sections 210 into a format of a matrix product of the expanded modal matrix and an expanded signal matrix obtained by expanding the expanded signal vector s for the plurality of wireless communication sections 210. Furthermore, the control section 230 estimates an expanded signal matrix that satisfies predetermined conditions by using the M-FOCUSS, and estimates the reception time of the first incoming wave based on an estimation result.

Redefinition of Equations Related to Sparse Reconstruction

In the above description, formulation has been performed in the case where the CIR is calculated for the reception signal received by the one wireless communication section 210, and sparse reconstruction is performed. Formulation is performed on a plurality of reception signals received by the plurality of wireless communication sections 210 below.

In the case where the portable device 100 transmits a transmission signal, the control section 230 correlates the transmission signal with reception signals received by the plurality of respective wireless communication sections 210 at a designated interval after timings set by the plurality of respective wireless communication sections 210, and calculates CIRs for the plurality of respective wireless communication sections 210. The timings set by the plurality of respective wireless communication sections 210 refer to counting start times of time counters of the plurality of respective wireless communication sections 210. Next, description will be given assuming that the plurality of respective wireless communication sections 210 have a same counting start time. That is, it is assumed that the plurality of respective wireless communication sections 210 are in synchronization with each other. Of course, the plurality of respective wireless communication sections 210 may be asynchronous with each other.

It is assumed that the number of the wireless communication sections 210 (i.e., the number of the antennas 211) is K, and an index indicating the individual antenna 211 is k. $z_k(\tau)$ that indicates a CIR obtained by correlating a transmission signal with a reception signal received by a k-th antenna is expressed by a following equation.

[Mathematical 32]

$$z_k(\tau) = \int_0^T u^*(t-\tau)x_k(t)dt \quad (32)$$

Here, $x_k(t)$ represents the reception signal received by the k-th antenna.

A data vector $z^{(k)}$ obtained by discretizing the CIR of the k-th antenna with the number of times of sampling M is expressed by a following equation.

[Mathematical 33]

$$\begin{aligned} z^{(k)} &= [z_k(\tau_1), z_k(\tau_2), \ldots, z_k(\tau_M)]^T \\ &= A_s B_k s_s + n^{(k)} \\ &= A_s y_s^{(k)} + n^{(k)} \in \mathbb{C}^{M \times 1} \end{aligned} \quad (33)$$

Here, $A_s$ represents a modal matrix obtained by arranging all modal vectors of the L wave in a column. $A_s$ is expressed by a following equation.

[Mathematical 34]

$$A_s = [r(T_{01}), r(T_{02}), \ldots, r(T_{0L})] \in \mathbb{C}^{M \times L} \quad (34)$$

[Mathematical 35]

$$r(T_{0i}) = [r(\tau_1 - T_{0i}), r(\tau_2 - T_{0i}), \ldots, r(\tau_M - T_{0i})]^T \in \mathbb{C}^{M \times 1} \quad (35)$$

Furthermore, Ss represents a signal vector of an antenna that serves as a reference (hereinafter, also referred to as a reference antenna) among K antennas. Ss is expressed by a following equation.

[Mathematical 36]

$$s_s = [h_1 e^{-j2\pi f T_{01}}, h_2 e^{-j2\pi f T_{02}}, \ldots, h_L e^{-j2\pi f T_{0L}}]^T \in \mathbb{C}^{L \times 1} \quad (36)$$

Furthermore, Bk represents a diagonal matrix indicating a phase difference between the k-th antenna and the reference antenna. Bk is expressed by a following equation.

[Mathematical 37]

$$B_k = \text{diag}[e^{-jr_{k1}}, \ldots, e^{-jr_{kL}}] \quad (37)$$

Here, $r_{kL}$ represents a phase difference generated depending on an arrival angle when the k-th antenna receives an L-th pulse. The phase difference described herein is delay of a phase from the reference antenna. For example, Bk in a case where K=4 holds and the four antennas 211 constitute a 2×2 planner array will be described with reference to FIG. 13.

Figure 13:
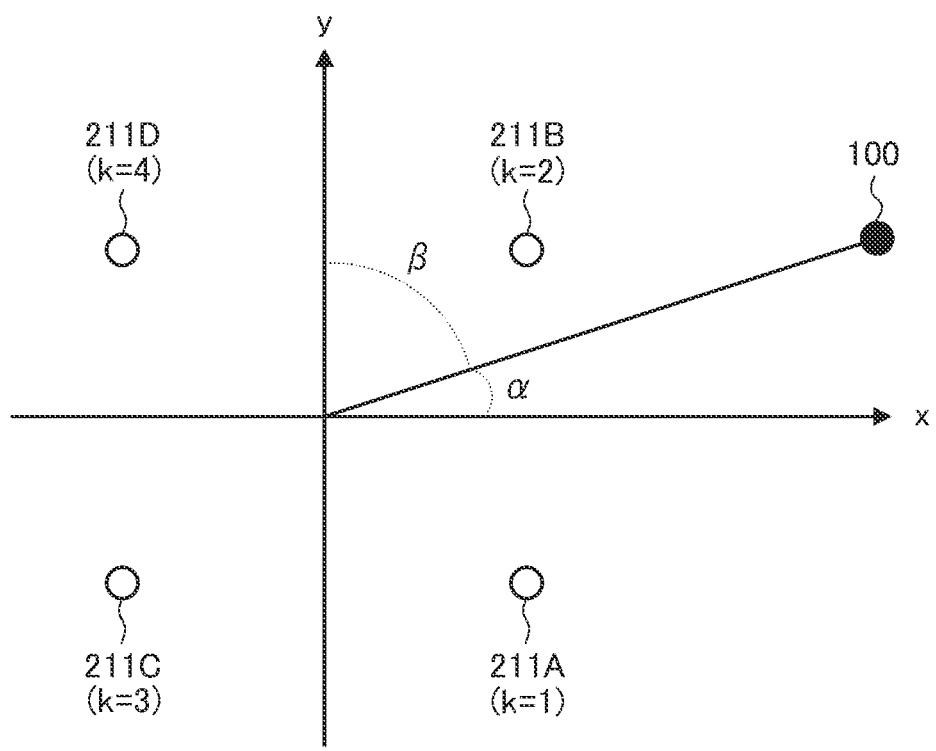
FIG. 13 is a view for describing a case where four antennas constitute a 2×2 planner array.

FIG. 13 is a view for describing the case where the four antennas 211 constitute the 2×2 planner array. As illustrated in FIG. 13, the antenna 211A to the antenna 211D constitute the 2×2 planner array. An angle formed between an arrival direction of a reception signal (i.e., a straight line connecting the portable device 100 to the origin) and an X axis is α. An angle formed between the arrival direction of the reception signal and a Y axis is β. Furthermore, the antenna 211A is referred to as a first antenna (i.e., k=1). The antenna 211B is referred to as a second antenna (i.e., k=2). The antenna 211C is referred to as a third antenna (i.e., k=3). The antenna 211D is referred to as a fourth antenna (i.e., k=4). In the case where (k=1) serves as the reference antenna, Bk is respectively expressed by following equations.

[Mathematical 38]

$$\begin{aligned} B_1 &= \text{diag}[e^{-j0}, \ldots, e^{-j0}] \\ &= \text{diag}[1, \ldots, 1] = I \end{aligned} \quad (38)$$

[Mathematical 39]

$$B_2 = \text{diag}\left[e^{-j\frac{2\pi}{\lambda}d\cos\beta_1}, \ldots, e^{-j\frac{2\pi}{\lambda}d\cos\beta_L}\right] \quad (39)$$

[Mathematical 40]

$$B_3 = \text{diag}\left[e^{-j\frac{2\pi}{\lambda}d\cos\alpha_1}, \ldots, e^{-j\frac{2\pi}{\lambda}d\cos\alpha_L}\right] \quad (40)$$

[Mathematical 40]

$$B_4 = \text{diag}\left[e^{-j\left(\frac{2\pi}{\lambda}d\cos\alpha_1 + \frac{2\pi}{\lambda}d\cos\beta_1\right)}, \ldots, e^{-j\left(\frac{2\pi}{\lambda}d\cos\alpha_L + \frac{2\pi}{\lambda}d\cos\beta_L\right)}\right] \quad (41)$$

Note that I represents an identity matrix.

Furthermore, $n^{(k)}$ represents an internal noise vector of the k-th antenna.

Furthermore, $y_s^{(k)}$ represents a signal vector of the k-th antenna. $y_s^{(k)}$ is expressed by a following equation using Bk and Ss.

[Mathematical 42]

$$y_s^{(k)} = B_k s_s \in \mathbb{C}^{L \times 1} \quad (42)$$

According to sparse reconstruction, the data vector $z^{(k)}$ is converted into a format including a matrix product of the expanded modal matrix A and $y^{(k)}$.

[Mathematical 43]

$$z^{(k)} = A y^{(k)} + n^{(k)} \quad (43)$$

Here, λ represents the above-described expanded modal matrix. Furthermore, $y^{(k)}$ corresponds to the above-described expanded signal vector of the k-th antenna.

Application of M-FOCUSS

Expanding the above equation (43) for the plurality of wireless communication sections 210 ignoring the internal noise converts Z into the format including the matrix product of A and Y.

[Mathematical 44]

$$Z = AY \quad (44)$$

Z represents a matrix obtained by arranging the K data vectors $z^{(k)}$. That is, Z represents a vector obtained by arranging for the plurality of wireless communication sections 210 CIRs obtained for the plurality of respective wireless communication sections 210. Z is also referred to as a data matrix. Z is expressed by the following equation.

[Mathematical 45]

$$Z = [z^{(1)}, \ldots, z^{(K)}] \in \mathbb{C}^{M \times K} \quad (45)$$

Y represents a matrix obtained by arranging for the plurality of wireless communication sections 210 expanded signal vectors obtained for the plurality of respective wireless communication sections 210. Y is also referred to as an expanded signal matrix. Y is expressed by the following equation.

[Mathematical 46]

$$Y = [y^{(1)}, \ldots, y^{(K)}]$$
$$= [y^T[1], \ldots, y^T[N]]^T \in \mathbb{C}^{N \times K} \quad (46)$$

Here, $y^{(k)}$ represents a k-th column vector of the expanded signal matrix Y. On the other hand, y[i] represents an i-th row vector of the expanded signal matrix Y. A relation between $y^{(k)}$ and y[i] will be described in detail with reference to FIG. 14.

Figure 14:
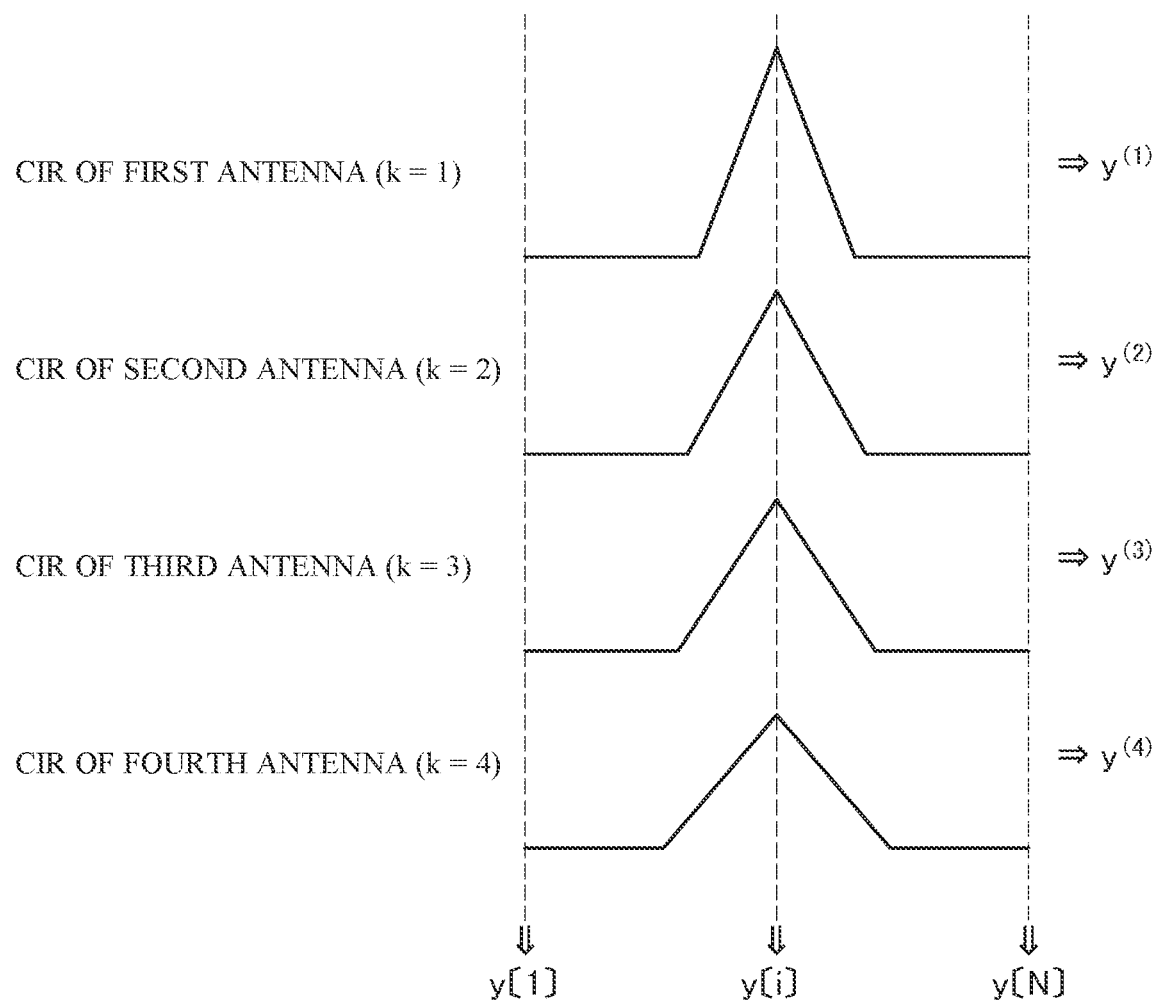
FIG. 14 is a view for describing a relation between y(k) and y[i].

FIG. 14 is a view for describing the relation between $y^{(k)}$ and y[i]. As illustrated in FIG. 14, $y^{(k)}$ represents an expanded signal vector corresponding to a CIR of the k-th antenna. Specifically, $y^{(1)}$ represents an expanded signal vector corresponding to a CIR of the first antenna (i.e., k=1). $y^{(2)}$ represents an expanded signal vector corresponding to a CIR of the second antenna (i.e., k=2). $y^{(3)}$ represents an expanded signal vector corresponding to a CIR of the third antenna (i.e., k=3). $y^{(4)}$ represents an expanded signal vector corresponding to a CIR of the fourth antenna (i.e., k=4). On the other hand, y[i] represents a vector obtained by arranging elements corresponding to an i-th delay time in the CIRs of the all antennas. For example, y[1] represents a vector obtained by arranging elements corresponding to the delay time bin $T_1$ in the four CIRs. y[N] represents a vector obtained by arranging elements corresponding to the delay time bin $T_N$ in the four CIRs.

The control section 230 estimates an expanded signal matrix Y that minimizes a predetermined norm. In this case, the control section 230 minimizes the predetermined norm, and estimates the expanded signal matrix Y serving as a sparse solution under a condition that the above-described equation (44) is satisfied.

The predetermined norm is a norm of a vector obtained by arranging, for the plurality of delay times, values obtained by performing predetermined computation on a plurality of elements corresponding to the same set time among elements included in the expanded signal matrix Y. That is, the predetermined norm may be a norm of a vector obtained by arranging N values obtained by performing the predetermined computation on a plurality of elements included in y[i].

For example, the predetermined computation may correspond to finding square roots of values obtained by summing squares of the plurality of elements corresponding to the same delay time. In this case, the predetermined norm may be a norm of an N-th dimensional vector expressed by the following equation.

[Mathematical 47]

$$[\|y^T[1]\|_2, \ldots, \|y^T[N]\|_2]^T \quad (47)$$

For another example, the predetermined computation may correspond to averaging.

Here, the norm is the length of the vector. The norm may be an lp-norm. The lp-norm is expressed by the following equation.

[Mathematical 48]

$$\|x\|_p = |x_1|^p + |x_2|^p + \ldots + |x_n|^p \quad (48)$$

Here, p represents a constant that is 0 or more and 1 or less. In this regard, it is assumed that $0^0 = 0$ holds in the equation (48).

Next, it is assumed that the control section 230 estimates, as the predetermined norm, the expanded signal matrix Y that minimizes the lp-norm of a vector obtained by arranging, for the plurality of delay times, square roots of values obtained by summing squares of a plurality of elements corresponding to the same delay time among elements included in the expanded signal matrix Y. Specifically, by iteratively calculating following STEP 1 to STEP 3, the control section 230 estimates the expanded signal matrix Y that minimizes the predetermined norm.

[Mathematical 49]
Step 1:

$$W_m = \mathrm{diag}\left(\|y_{m-1}[1]\|_2^{1-p/2}, \ldots, \|y_{m-1}[N]\|_2^{1-p/2}\right) \quad (49)$$

[Mathematical 50]
Step 2:

$$Q_m = A_m^H (A_m A_m^H)^{-1} Z$$

with $A_m = A W_m$ $\quad (50)$

[Mathematical 51]
Step 3:

$$Y_m = W_m Q_m \quad (51)$$

Here, $Y_m$ represents a candidate of the expanded signal matrix Y that minimizes the predetermined norm. m represents the number of times of iteration. $y_{m-1}[i]$ represents a vector that is included in $Y_{m-1}$, and is the vector that includes elements corresponding to an i-th delay time in the expanded signal matrix. i represents an index of the delay time. N represents a maximum value of the index i of the delay time.

An initial value $Y_0$ of $Y_m$ is given by the following equation.

[Mathematical 52]

$$Y_0 = A^- Z \quad (52)$$

Here, $A^-$ represents the generalized inverse matrix of the expanded modal matrix A. The generalized inverse matrix may be a Moore-Penrose generalized inverse matrix. Therefore, the initial value $Y_0$ is the minimum norm solution of Y. However, the initial value $Y_0$ is not the sparse solution.

The control section 230 repeatedly executes above STEP 1 to STEP 3. For example, STEP 1 to STEP 3 may be repeatedly executed until $Y_m$ converges. For another example, STEP 1 to STEP 3 may be repeatedly executed a predetermined number of times. This makes it possible to estimate the expanded signal matrix Y that is closer to a true value.

Estimation of Reception Time of First Incoming Wave

The control section 230 estimates a reception time of the first incoming wave based on the expanded signal matrix Y that is estimated by the M-FOCUSS and minimizes the predetermined norm. According to the M-FOCUSS, the expanded signal matrix Y is estimated under the condition that the expanded signal matrix Y matches with the CIRs of the plurality of wireless communication sections 210. Therefore, it is possible to improve estimation accuracy of the reception time of the first incoming wave compared to the case where the expanded signal vector s is estimated under the condition that the expanded signal vector s matches with only one CIR.

The estimation method relates to estimation of a propagation delay time based on the expanded signal vector, and is as described above. That is, the control section 230 estimates as the reception time of the first incoming wave a delay time corresponding to a nonzero element of the expanded signal matrix that minimizes the predetermined norm. In particular, the control section 230 estimates as the reception time of the first incoming wave an earliest delay time among delay times corresponding to the nonzero elements of the expanded signal matrix that minimizes the predetermined norm. Note that the plurality of $y^{(k)}$ included in the expanded signal matrix Y include the nonzero element at a common delay time.

(5) Regularization Parameter

The example of the method for estimating the expanded signal matrix Y that minimizes the predetermined norm by the M-FOCUSS, and estimating the reception time of the first incoming wave based on the estimated expanded signal matrix Y has been described above.

In this regard, one of features includes that the control section 230 according to the present embodiment performs iterative calculation that uses a regularization parameter that is a positive infinitesimal when estimating the expanded signal matrix Y that minimizes the predetermined norm in order to further improve estimation accuracy of the expanded signal matrix Y.

In a case of, for example, the M-FOCUSS, the control section 230 may use a following equation (53) in place of the equation (50) in above STEP 2.

[Mathematical 53]

$$Q_m = A_m^H = (A_m A_m^H + \alpha I)^{-1} Z$$

$$\text{with } A_m = A W_m \tag{53}$$

In this regard, α represents the above regularization parameter. I represents an identify matrix. Note that iterative calculation that uses the regularization parameter can be performed not only for the M-FOCUSS, but also for the FOCUSS. Regularization parameters for the FOCUSS and the M-FOCUSS are mentioned in the first non-patent document and the second non-patent document.

By using the regularization parameter for iterative calculation, an effect of further facilitating convergence of $Y_m$, and improving estimation accuracy of the expanded signal matrix Y that minimizes the predetermined norm is expected.

On the other hand, in a case where a value of the regularization parameter used for iterative calculation is not appropriate, estimation accuracy of the expanded signal matrix Y that minimizes the predetermined norm is likely to deteriorate to the contrary.

In order to avoid the above situation, the control section 230 according to the present embodiment may perform control of changing the regularization parameter to an appropriate value according to a reception status of a reception signal during iterative calculation.

More specifically, one of the features includes that the control section 230 according to the present embodiment executes iterative calculation separately at a plurality of stages, sets a value of the regularization parameter used for iterative calculation at or after a second stage of the plurality of stages to a value of the regularization parameter or more used for iterative calculation at a previous stage, and changes the value of the regularization parameter based on a reception status of a second signal during the iterative calculation at or after the second stage.

Figure 15:
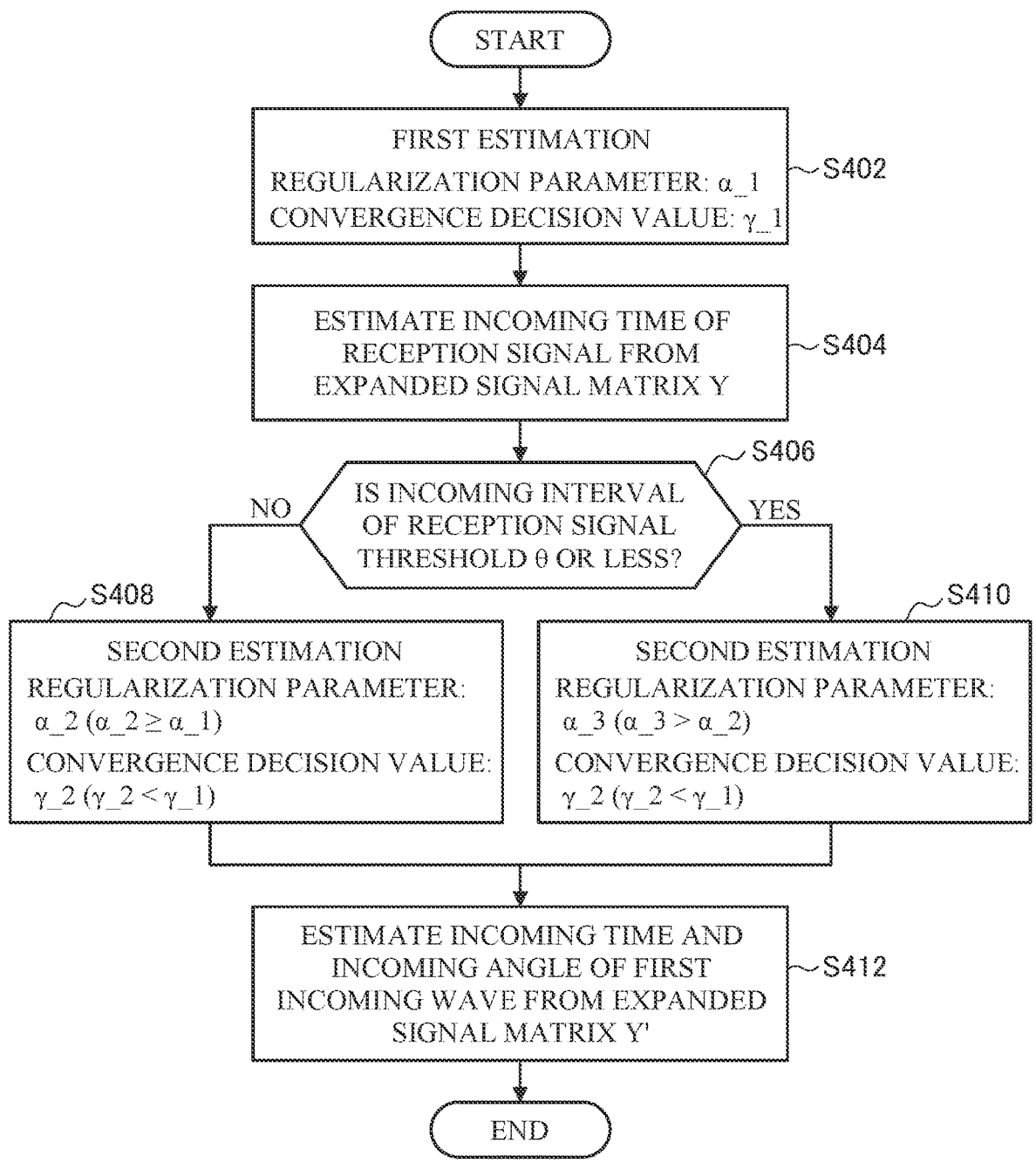
FIG. 15 is a flowchart illustrating a control example of a regularization parameter according to the present embodiment.

Control of the regularization parameter according to the present embodiment will be described in detail below. FIG. 15 is a flowchart illustrating a control example of the regularization parameter according to the present embodiment.

Note that FIG. 15 illustrates a case where the control section 230 performs iterative calculation separately at two stages. Furthermore, there is a case where iterative calculation at an N-th stage is referred to as N-th estimation in FIG. 15 and the following description. For example, iterative calculation at the first stage is referred to as first estimation, and iterative calculation at the second stage is referred to as second estimation.

In a case of the example illustrated in FIG. 15, the control section 230 sets α_1 to the regularization parameter and γ_1 to a convergence decision value, and performs first estimation (S402).

The above convergence decision value is a reference value used for convergence decision of $Y_m$ per N-th estimation. In a case where the convergence decision value is Y, the control section 230 may perform convergence decision based on a following equation (54). In this regard, the following equation (54) is a mere example.

[Mathematical 54]

$$\|\hat{Y}_m - \hat{Y}_{m-1}\|_F / \|\hat{Y}_m\|_F < \gamma \tag{54}$$

Next, the control section 230 estimates an incoming time of a reception signal based on the expanded signal matrix Y estimated in step S402 (S404). Hereinafter, an example of a method for estimating an incoming time of a reception signal will be described with reference to FIG. 16.

Figure 16:
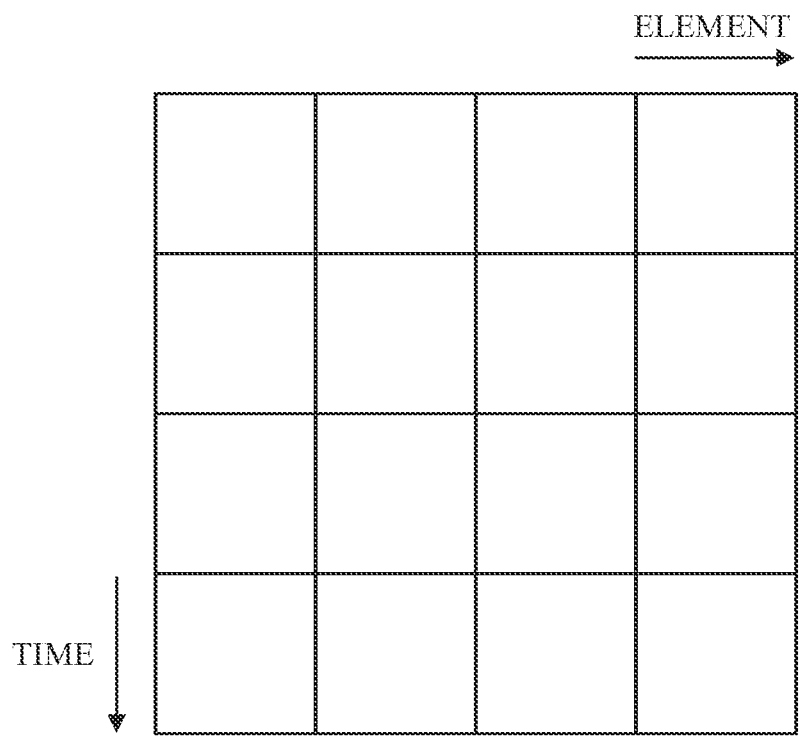
FIG. 16 is an explanatory view for describing an outline of an expanded signal matrix Y according to the present embodiment.

FIG. 16 is an explanatory view for describing an outline of the expanded signal matrix Y according to the present embodiment. As illustrated in FIG. 16, a horizontal direction (row direction) of the expanded signal matrix Y is an element direction, and a vertical direction (column direction) is a time direction. FIG. 16 illustrates an example of the expanded signal matrix Y where the number of elements is four.

First, the control section 230 estimates an expanded signal power vector $p_Y$ based on the expanded signal matrix Y. The expanded signal power vector $p_Y$ is a vector obtained by calculating squares of absolute values for respective components of the expanded signal matrix Y, and averaging the squares in the element direction.

In a case where, for example, an element of the i-th row and the j-th column of the expanded signal matrix Y in the above-described equation (46) is Y(i, j), the control section 230 may estimate the expanded signal power vector $p_Y$ based on a following equation (55).

[Mathematical 55]

$$p_Y = [P_Y(1), \ldots, P_Y(N)] \in \mathbb{C}^{N \times 1} \tag{55}$$

$$P_Y(i) = \frac{1}{K} \sum_{j=1}^{K} |Y(i, j)|^2$$

Furthermore, the control section 230 may estimate a component of a predetermined value or more in the expanded signal power vector $p_Y$ as the incoming time of the reception signal. Note that, although a value obtained by, for example, "maximum value of expanded signal power vector $p_Y \times 0.5$" may be set to the predetermined value, the predetermined value is not limited to this example.

The example related to estimation of the incoming time of the reception signal has been described above. Note that the method for estimating the incoming time of the reception signal is not limited to the above-described example. The rest of the control example of the regularization parameter according to the present embodiment will be described with reference to FIG. 15 again.

After the incoming time of the reception signal is estimated (S404), the control section 230 decides whether or not an incoming interval of the reception signal is a threshold θ or less (S406).

The above incoming interval of the reception signal may be, for example, an interval between the first incoming wave and the second incoming wave. 0.5 ns, 2 ns, or the like may be set to the threshold θ in this case.

In this regard, the above interval is a mere example. The above incoming interval of the reception signal may adopt the longest interval or the shortest interval between incoming waves, an average value or a median value of a plurality of intervals, or the like. Furthermore, the threshold θ may be appropriately designed.

For example, the control section 230 may use as the incoming interval of the reception signal a difference between an incoming time of a reception signal whose expanded signal power vector $p_Y$ is maximum and an incoming time of another reception signal that is the closest to the incoming time of the reception signal among the estimated incoming times of the reception signals.

In the example illustrated in FIG. 15, in a case where the incoming interval of the reception signal is larger than the threshold θ (S406: No), the control section 230 sets $\alpha\_2$ to the regularization parameter and $\gamma\_2$ to the convergence decision value, and performs second estimation (S408).

On the other hand, in a case where the incoming interval of the reception signal is the threshold θ or less (S406: Yes), the control section 230 sets $\alpha\_3$ to the regularization parameter and $\gamma\_3$ to the convergence decision value, and performs second estimation (S410).

In this regard, one of the features includes that the control section 230 according to the present embodiment changes a value of the regularization parameter used for N-th estimation to a value of the regularization parameter or more used for N−1th estimation at a previous stage.

Furthermore, one of the features includes that the control section 230 according to the present embodiment makes the value of the regularization parameter smaller for the second and subsequent estimations as the incoming interval of the reception signal is longer.

In the case of the example illustrated in FIG. 15, the control section 230 may perform control such that the value of the regularization parameter satisfies $\alpha\_3 > \alpha\_2 \_\alpha\_1$.

In a case where, for example, the value of $\alpha\_1$ for the first estimation is $10^{-4}$, the control section 230 may set the value of $\alpha\_2$ to 103 and the value of $\alpha\_3$ to $10^{-2}$.

Note that, although the single threshold θ is set for decision in step S406 in the example illustrated in FIG. 15, the number of thresholds used for the decision may be two or more. That is, the number of branches based on the incoming interval of the reception signal may be three or more. Even in this case, the above-mentioned two features related to control of the regularization parameter only need to be satisfied.

Furthermore, one of the features includes that, regarding convergence decision values used for convergence decision of iterative calculation, the control section 230 according to the present embodiment makes convergence decision values used for the second and subsequent estimations smaller than a convergence decision value used for the N−1th estimation that is the previous stage.

In the case of the example illustrated in FIG. 15, the control section 230 may perform control such that the convergence decision value satisfies $\gamma\_1 > \gamma\_2$.

In a case where, for example, $\gamma\_1$ of the first estimation is $10^{-1}$, the control section 230 may set $\gamma\_2$ to $10^{-6}$.

Note that the convergence decision value may be an identical value irrespectively of the branch in step S406 during calculation at the same stage, and may adopt a different value depending on the branch.

After the second estimation (S408 or S410) that uses the regularization parameter and the convergence decision value set as described above, the control section 230 estimates an incoming time and an incoming angle of the first incoming wave from an expanded signal matrix Y' obtained by the second estimation (S412).

Note that, although FIG. 15 illustrates the case where the control section 230 separates iterative calculation into two stages (i.e., the first estimation and the second estimation), the number of stages related to iterative calculation may be three or more. Even in this case, the value of the regularization parameter used for the N-th estimation only needs to be set larger than the value of the regularization parameter used for the N−1th estimation that is the previous stage, and the convergence decision value used for the N-th estimation only needs to be set smaller than the convergence decision value used for the N−1th estimation that is the previous stage.

Next, a flow of iterative calculation that uses a regularization parameter and a convergence decision value according to the present embodiment will be described in more detail.

Figure 17:
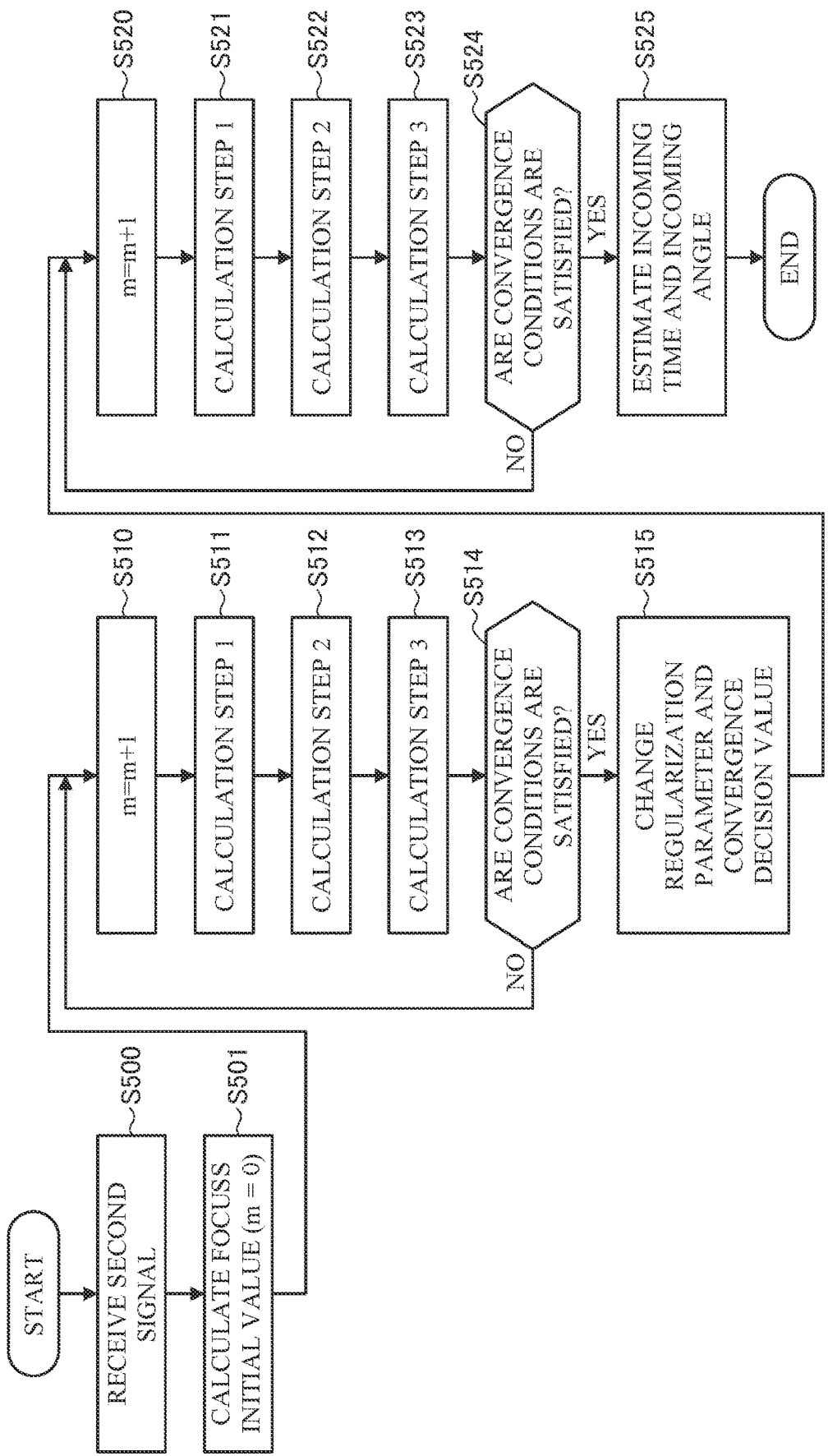
FIG. 17 is a flowchart illustrating an example of a flow of iterative calculation that uses the normalization parameter and a convergence decision value according to the present embodiment.

FIG. 17 is a flowchart illustrating an example of a flow of iterative calculation that uses a regularization parameter and a convergence decision value according to the present embodiment. Note that FIG. 17 illustrates a case where the control section 230 separates the iterative calculation into two stages (i.e., the first estimation and the second estimation).

In a case of the example illustrated in FIG. 17, the wireless communication section 210 first receives the second signal (S500).

Next, the control section 230 calculates an initial value of the FOCUSS or the M-FOCUSS. In step S501, 0 is substituted for m that is a variable indicating the number of times of iteration.

Next, the control section 230 executes the first estimation including steps S510 to S514.

During the first estimation, the control section 230 increments m (S510), and performs calculation corresponding to above-described STEPs 1 to 3 (S511 to S513) in order. The calculation corresponding to above-described STEP 2 in S512 uses the regularization parameter.

Next, the control section 230 performs convergence decision related to the first estimation using the convergence decision value (S514).

When deciding that convergence conditions are not satisfied (S514: No), the control section 230 returns to step S510.

On the other hand, when deciding that the convergence conditions are satisfied (S514: Yes), the control section 230 changes the regularization parameter and the convergence decision value (S515).

Next, the control section 230 executes the second estimation including steps S520 to S524.

During the second estimation, the control section 230 increments m (S520), and performs calculation corresponding to above-described STEPs 1 to 3 (S521 to S523) in order.

The calculation corresponding to above-described STEP 2 in S522 uses the regularization parameter changed in step S515.

Next, the control section 230 performs convergence decision related to the second estimation using the convergence decision value changed in step S515 (S524).

When deciding that the convergence conditions are not satisfied (S524: No), the control section 230 returns to step S520.

On the other hand, when deciding that the convergence conditions are satisfied (S524: Yes), the control section 230 estimates the incoming time and the incoming angle of the first incoming wave from the expanded signal matrix Y' obtained by the second estimation (S525).

The flow of the iterative calculation that uses the regularization parameter and the convergence decision value according to the present embodiment has been described citing the example.

Note that, although FIG. 17 illustrates the case where the number of times of iteration is continuously incremented for the first estimation and the second estimation, the number of times of iteration may be reset to 0 between the first estimation and the second estimation.

Furthermore, FIG. 17 illustrates the case where iterative calculation is performed until the convergence conditions are satisfied. However, the iterative calculation may be finished when executed a predetermined number of times.

Furthermore, the above-described example has mainly described the example where the reception status of the signal used to set the value of the regularization parameter for the second and subsequent estimations is the incoming interval of the reception signal. However, the reception status of the signal used to set the value of the regularization parameter is not limited to the incoming interval of the reception signal.

For example, the control section 230 according to the present embodiment may change the value of the regularization parameter based on signal power of the reception signal for the second and subsequent estimations. More specifically, one of the features may include that the control section 230 makes the value of the regularization parameter smaller for the second and subsequent estimations as the signal power of the reception signal is greater.

The reception power described herein may be, for example, a maximum value of the expanded signal power vector $p_Y$. Furthermore, the reception power may be a total value or an average value of a plurality of components having the larger values of the expanded signal power vectors $p_Y$. For example, a total value of components having the predetermined value of the expanded signal power vectors $p_Y$ or more may be the reception power.

Furthermore, the control section 230 according to the present embodiment may change the value of the regularization parameter based on noise power of a reception signal for the second and subsequent estimations. More specifically, one of the features includes that the control section 230 makes the value of the regularization parameter smaller for the second and subsequent estimations as the noise power of the reception signal is less.

Note that, in a case where the noise power of the reception signal is used to set the regularization parameter, the control section 230 may estimate the noise power of the reception signal by including following STEP 4 after above STEP 3 of the iterative calculation. That is, the control section 230 may add the process of STEP 4 according to a following equation (56) after step S513 illustrated in FIG. 17 and after step S523, and estimate the noise power of the received signal.

[Mathematical 56]

$$\text{STEP 4}: \sigma^{2(m)} = \frac{1}{MK}\|Z - Ay_m\|_F^2 + \frac{\sigma^{2(m-1)}}{M}Tr\left[G_m\left(\sigma^{2(m-1)}I + G_m\right)^{-1}\right]$$

$$G_m \triangleq AW_mA^T$$

(56)

Note that, in the equation (56), $\sigma^2$ represents noise power, $|\cdot|_F$ represents a Frobenius norm, and $Tr[\cdot]$ represents a trace of a matrix (a sum of diagonal components).

Furthermore, the control section 230 according to the present embodiment may change the value of the regularization parameter for the second and subsequent estimations based on a Signal to Noise Ratio (SNR) of a reception signal. More specifically, one of the features includes that the control section 230 makes the value of the regularization parameter smaller for the second and subsequent estimations as a value of the SNR of the reception signal is greater. Consequently, it is possible to set the regularization parameter suitable for a situation of the SNR. Note that the SNR is an example of a signal to noise ratio.

In a case where, for example, reception power is SP, the control section 230 may calculate the SNR according to a following equation (57).

[Mathematical 57]

$$SNR = 10\log_{10}\frac{SP}{\sigma^{2(a)}}$$

(57)

Furthermore, the control section 230 may set the value of the regularization parameter by combining the above-described reception statuses of various signals for the second and subsequent estimations. Control of a regularization parameter based on an SNR of a reception signal and an incoming interval of a reception signal will be described in detail as an example.

Figure 18:
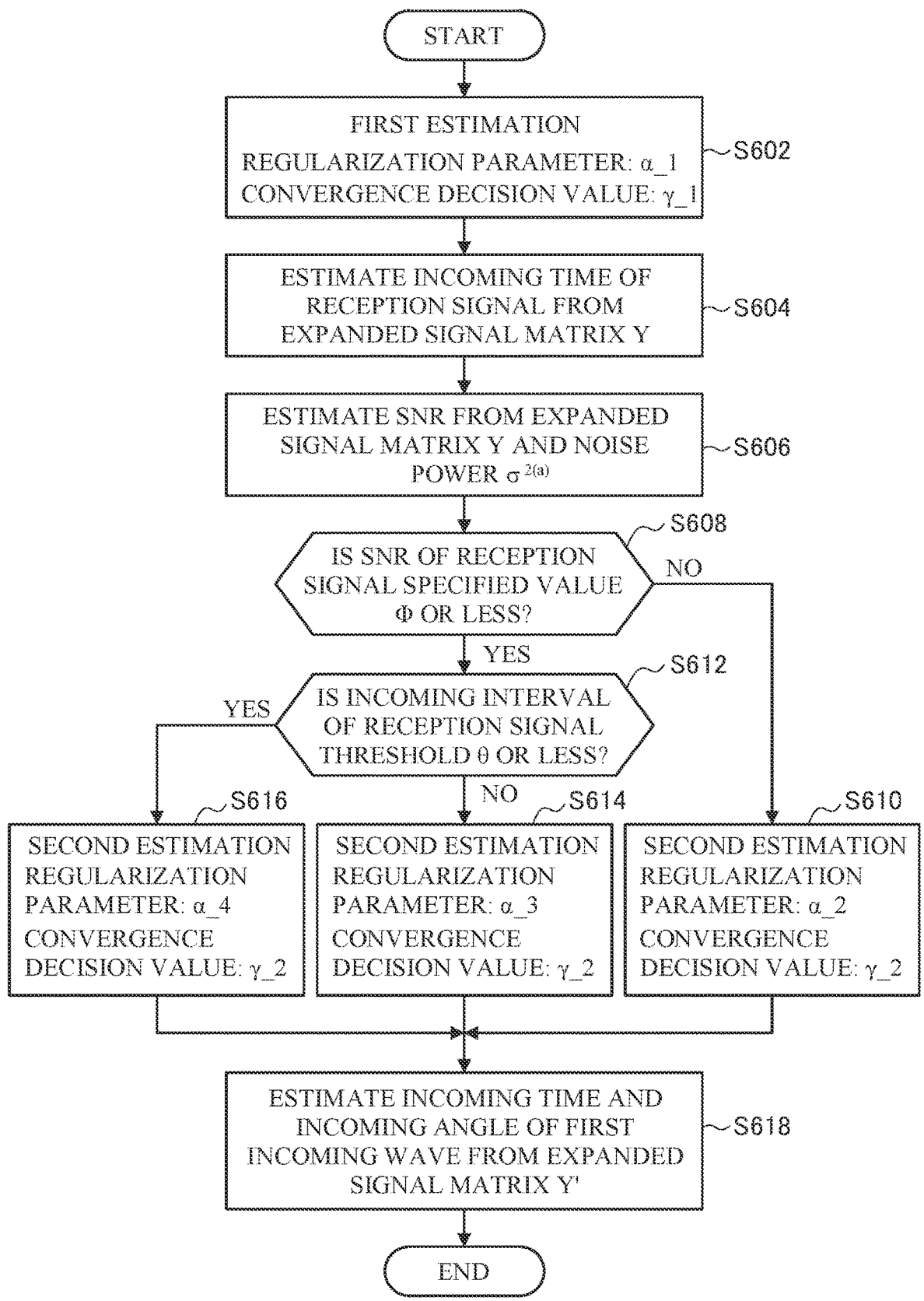
FIG. 18 is a flowchart illustrating a control example of a regularization parameter according to a second embodiment.

FIG. 18 is a flowchart illustrating a control example of a regularization parameter according to the second embodiment. Note that FIG. 18 illustrates a case where the control section 230 performs iterative calculation separately at two stages similar to FIG. 15. Furthermore, description that overlaps those in FIG. 15 will be omitted in FIG. 18.

First, in the case of the example illustrated in FIG. 18, the control section 230 sets $\alpha\_1$ to the regularization parameter and $\gamma\_1$ to the convergence decision value, performs the first estimation based on an input expanded signal matrix $Y_0$ and noise power $\sigma^{2(0)}$, and estimates the expanded signal matrix Y (S602). A case where $\alpha\_1$ is $10^{-4}$, $\gamma\_1$ is $10^{-1}$, and $\sigma^{2(0)}$ is 0 will be mainly described below. However, $\alpha\_1, \gamma\_1$, and $\sigma^{2(0)}$ are not limited to this example.

Next, the control section 230 estimates an incoming time of a reception signal based on the expanded signal matrix Y estimated in step S602 (S604).

Next, the control section 230 estimates an SNR of the reception signal based on the expanded signal matrix Y and the noise power $\sigma^{2(0)}$ estimated in step S602 (S606).

Furthermore, the control section 230 decides whether or not the SNR of the reception signal is a specified value Φ or less (S608). In the example illustrated in FIG. 18, in a case where the SNR of the reception signal is larger than the specified value Φ (S608: No), the control section 230 sets $\alpha\_2$ to the regularization parameter and $\gamma\_2$ to the convergence decision value, and performs the second estimation (S610). Note that, for example, 20 dB may be set to the specified value Φ.

In a case where the SNR of the reception signal is the specified value Φ or less (S608: Yes), the control section 230 decides whether or not an incoming interval of the reception signal is the threshold θ or less (S612).

In the example illustrated in FIG. 18, in a case where the incoming interval of the reception signal is larger than the threshold θ (S612: No), the control section 230 sets $\alpha\_3$ to the regularization parameter and $\gamma\_2$ to the convergence decision value, and performs the second estimation (S614).

On the other hand, in a case where the incoming interval of the reception signal is the threshold θ or less (S612: Yes), the control section 230 sets $\alpha\_4$ to the regularization parameter and $\gamma\_2$ to the convergence decision value, and performs the second estimation (S614).

In this regard, as described above, one of the features includes that the control section 230 according to the present embodiment makes the value of the regularization parameter smaller for the second and subsequent estimations as the value of the SNR of the reception signal is larger. Furthermore, one of the features includes that the control section 230 makes the value of the regularization parameter smaller for the second and subsequent estimations as the incoming interval of the reception signal is longer.

According to these two features, in the case of the example illustrated in FIG. 18, the control section 230 may perform control such that the value of the regularization parameter satisfies $\alpha\_4 > \alpha\_3 > \alpha\_2 > \alpha\_1$. Note that $\alpha\_2$ described herein is an example of a first value.

In a case where, for example, the value of $\alpha\_1$ for the first estimation is $10^{-4}$, the control section 230 may set the value of $\alpha\_2$ to 104, the value of $\alpha\_3$ to $10^{-3}$, and the value of $\alpha\_4$ to $10^{-2}$.

Note that, although the single specified value Φ and threshold θ are respectively set for decision in steps S608 and S610 in the example illustrated in FIG. 18, the numbers of specified values and thresholds used for the decision may be respectively two or more. That is, in the above-described flow, the regularization parameter is branched into three patterns ($\alpha\_2$, $\alpha\_3$, and $\alpha\_4$) depending on the SNR of the reception signal and the incoming interval of the reception signal. However, the regularization parameter may be branched into four patterns or more.

Furthermore, in the example illustrated in FIG. 18, decision is performed based on the SNR of the reception signal in step S608, and decision is performed based on the incoming interval of the reception signal in subsequent step S610. However, decision may be performed based on the incoming interval of the reception signal first, and decision may be subsequently performed based on the SNR of the reception signal.

Furthermore, one of the features includes that, regarding convergence decision values used for convergence decision of iterative calculation, the control section 230 according to the present embodiment makes a convergence decision value used for the second and subsequent estimations smaller than a convergence decision value used for the N−1th estimation that is the previous stage.

In the case of the example illustrated in FIG. 15, the control section 230 may perform control such that the convergence decision value satisfies $\gamma\_1 > \gamma\_2$. In a case where, for example, $\gamma\_1$ for the first estimation is $10^{-1}$, the control section 230 may set $\gamma\_2$ to $10^{-6}$.

Note that the convergence decision value may be an identical value irrespectively of the branches in steps S608 and S612 during calculation at the same stage, and may take a different value depending on the branch.

After the second estimation (S610, S614, or S616) that uses the regularization parameter and the convergence decision value set as described above, the control section 230 estimates the incoming time and the incoming angle of the first incoming wave from the expanded signal matrix Y' obtained by the second estimation (S618).

Iterative calculation that uses the regularization parameter according to the present embodiment has been described above. According to the iterative calculation, it is possible to improve estimation accuracy of the expanded signal matrix that minimizes the predetermined norm, and improve accuracy of ranging value calculation and position estimation.

(6) Threshold Process

In the M-FOCUSS, a threshold process may be performed. Here, the threshold process is a process of substituting 0 for elements that are a second threshold or less. For example, the control section 230 may substitute zero for the element that is the second threshold or less among diagonal components of a weighting matrix $W_m$ in the equation (49) in above STEP 1. The second threshold may be set based on a maximum value among diagonal components of the weighting matrix $W_m$. For example, the control section 230 may set a value whose ratio with respect to the maximum value is the second threshold or less to zero for the diagonal component of the weighting matrix $W_m$.

According to the above-described threshold process, when the weighting matrix $W_m$ is created, elements that take values less than the second threshold among the elements of the expanded signal vector $Y_m$ are regarded not as signals but as noise, and are converted into zero. This makes it possible to converge the expanded signal vector $Y_m$ more quickly. Furthermore, nonzero elements are reduced, so that it is possible to easily obtain the sparse solution.

<4.2. Estimation of Positional Parameter>

The control section 230 estimates a positional parameter based on the first incoming wave detected by the above-described process.

Ranging Process

The control section 230 estimates the distance R between the portable device 100 and the communication unit 200 based on reception times of the first incoming waves estimated by the above-described process. The method for estimating the distance R has been described above with reference to FIG. 7.

Specifically, the communication unit 200 calculates the CIR for the first ranging signal, and performs the sparse reconstruction and the M-FOCUSS. Furthermore, the communication unit 200 measures the interval $INT_3$ while using as a reception time of the first incoming wave of the first ranging signal the time corresponding to the earliest delay time bin among the delay time bins corresponding to nonzero elements among the elements included in the expanded signal matrix Y estimated by the M-FOCUSS.

Similarly, the communication unit 200 calculates the CIR for the third ranging signal, and performs the sparse reconstruction and the M-FOCUSS. Furthermore, the communication unit 200 measures the interval $INT_4$ while using as a reception time of the first incoming wave of the third ranging signal the time corresponding to the earliest delay time bin among the delay time bins corresponding to nonzero elements among the elements included in the expanded signal matrix Y estimated by the M-FOCUSS.

Furthermore, the control section 230 estimates a propagation delay time based on the times $T_1$ to $T_4$, and estimates the distance R. As described above, it is possible to more accurately estimate the reception time of the first incoming wave by the M-FOCUSS. This makes it possible to improve ranging accuracy.

Angle Estimation Process

The communication unit 200 estimates the angles α and β based on phases at the reception time of the first incoming wave estimated by the above-described process. The method for estimating the angles α and β has been described above with reference to FIG. 8.

More specifically, the control section 230 estimates the angles α and β based on a phase of a nonzero element included in the expanded signal matrix Y estimated by the above-described process. More specifically, the control section 230 estimates the angles α and β based on a phase of an element corresponding to an earliest delay time among one or more nonzero elements included in the expanded signal matrix Y. For example, it is assumed that the earliest nonzero element appears at a delay time $T_i$ in the expanded signal matrix Y estimated by applying the M-FOCUSS to the CIRs obtained by the antenna configuration illustrated in FIG. 13. In this case, an antenna array phase difference $Pd_{AC}$ is calculated by the following equation.

[Mathematical 58]

$$Pd_{AC} = Pd_A - Pd_C \qquad (58)$$
$$= \text{angle}(Y(i, 1)) - \text{angle}(Y(i, 3))$$

Alternatively, the antenna array phase difference $Pd_{AC}$ may be calculated by the following equation.

[Mathematical 59]

$$Pd_{AC} = Pd_A - Pd_C \qquad (59)$$
$$= \text{angle}(y(i, 1) \times Y(i, 3)^*)$$

Note that angle( ) represents a function of calculating a phase angle of a complex number. Y(i, k) represents an element in the i-th row and the k-th column of the expanded signal matrix Y.

Other antenna array phase differences are also calculated similarly to the above, and the angle α and the angle β are calculated.

As described above, it is possible to more accurately estimate the reception time of the first incoming wave by the M-FOCUSS. By estimating the angles based on the phase of the element corresponding to the accurately estimated reception time of the first incoming wave among elements included in the expanded signal matrix Y, it is possible to improve angle estimation accuracy, too.

<4.3. Flow of Process>

Figure 19:
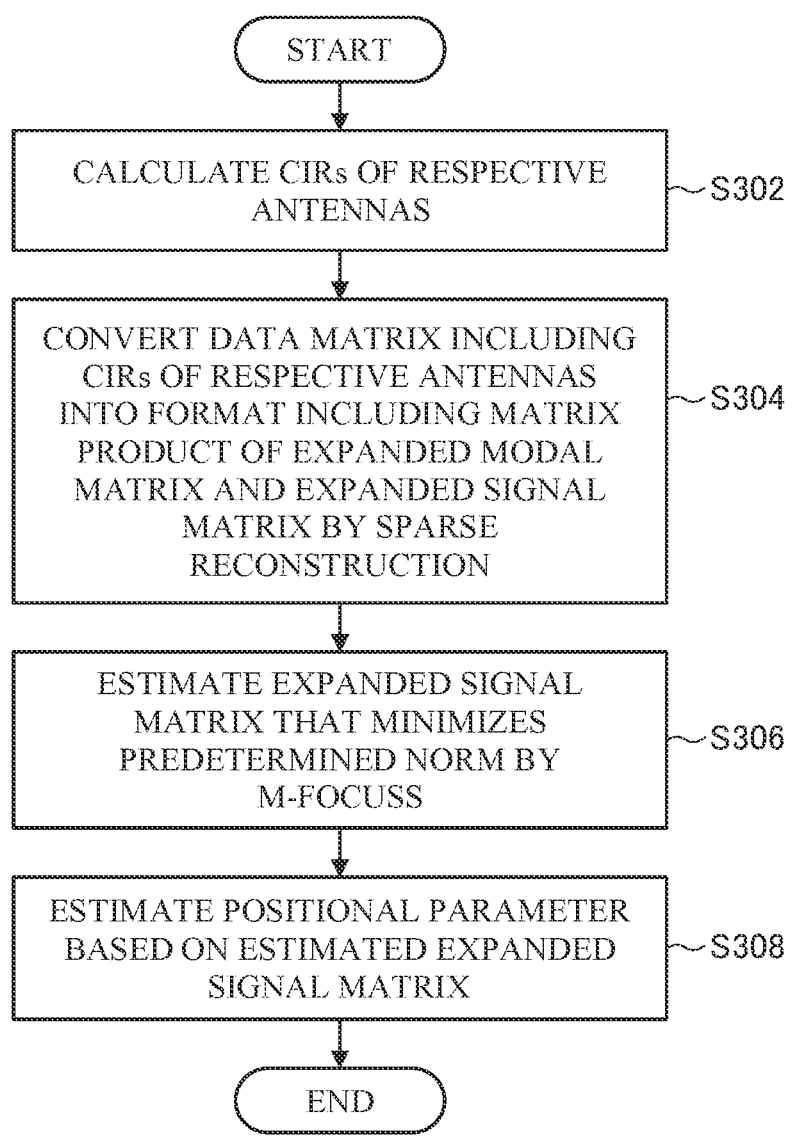
FIG. 19 is a flowchart illustrating an example of a flow of a positional parameter estimation process executed by the communication unit according to the present embodiment.

FIG. 19 is a flowchart illustrating an example of a flow of a positional parameter estimation process executed by the communication unit 200 according to the present embodiment.

As illustrated in FIG. 19, the control section 230 first calculates CIRs of the respective antennas (step S302). Next, the control section 230 converts the data matrix including the CIRs of the respective antennas into the format including a matrix product of the expanded modal matrix and the expanded signal matrix by the sparse reconstruction (step S304). Next, the control section 230 estimates an expanded signal matrix that minimizes a predetermined norm by the M-FOCUSS (step S306). Furthermore, the control section 230 estimates a positional parameter based on the estimated expanded signal matrix (step S308).

<4.4. M-FOCUSS Application Target>

As described above, the transmitter may transmit as the transmission signal a signal including a plurality of preambles including one or more preamble symbols. In this case, the receiver may calculate CIRs for the respective preamble symbols by correlating the preamble symbols with respective portions of the reception signal corresponding to the plurality of preamble symbols at the designated interval after the transmitter transmits the transmission signal.

The M-FOCUSS may be applied to integrated CIRs obtained by integrating CIRs of the respective preamble symbols. On the other hand, the M-FOCUSS may be applied to a CIR of each preamble symbol.

Note that the CIR may be calculated per pulse. In this case, the M-FOCUSS may be applied to integrated CIRs obtained by integrating CIRs of respective pulses, or may be applied to a CIR of each pulse.

Furthermore, the CIR may be calculated for the entire preamble. In this case, the M-FOCUSS may be applied to the CIR calculated for the entire preamble.

It is possible to obtain similar results by using any of the methods.

<4.5. M-FOCUSS Application Range>

The M-FOCUSS may be applied to the entire CIR.

On the other hand, the M-FOCUSS may be applied to a portion of the CIR in a time axis direction. This makes it possible to reduce a calculation load compared to the case where the M-FOCUSS is applied to the entire CIR.

In particular, for a purpose of detecting the first incoming wave, it is desirable to apply the M-FOCUSS to a limited portion of the CIR near the reception time of the first incoming wave. Strong correlation is obtained at a delay time at which a pulse sequence of the transmission signal and a pulse sequence of the reception signal completely match, and correlation is weak at the other portions. Therefore, it is possible to maintain the detection accuracy of the first incoming wave even if the M-FOCUSS is applied to a limited portion of the CIR near the reception time of the first incoming wave.

As described above, by applying the M-FOCUSS to the limited portion of the CIR near the reception times of the first incoming wave, it is possible to maintain the detection accuracy, and reduce the calculation load compared to the case where the M-FOCUSS is applied to the entire CIR.

5. Supplement

Heretofore, the preferred embodiments of the present invention have been described in detail with reference to the appended drawings. However, the present invention is not limited to these embodiments. It should be understood by those who have a common knowledge in the technical field to which the present invention belongs that various changes and alterations may be made without departing from the scope of the technical idea recited in the appended claims. This should be understood by those skilled in the art that the various changes and alterations naturally belong to the technical range of the present invention.

For example, the above embodiments have been described assuming that the CIR is the correlation computation result. However, the present invention is not limited to these embodiments. For example, the CIR may be the reception signal itself (a complex number including IQ components). The CIR value may be the complex number including the IQ components that are the reception signal, may be a phase or an amplitude of the reception signal, or may be electric power that is a sum of squares of the I component and the Q component of the reception signal (or a square of the amplitude). In this case, the receiver detects the first incoming wave from the reception signal. For example, the receiver may use a condition that an amplitude or electric power of a received wireless signal exceeds a predetermined threshold for the first time, as the predetermined detection standard for detecting the first incoming wave. In this case, the receiver may detect as the first incoming wave a signal (more specifically, sampling point) whose amplitude or reception electric power has exceeded the predetermined threshold for the first time among reception signals.

For example, in the above embodiments, the control section 230 calculates the CIR, detects the first incoming wave, and estimates the positional parameter. However, the present invention is not limited to these embodiments. Any of these processes may be executed by the wireless communication section 210. For example, each of the plurality of wireless communication sections 210 may calculate the CIR, and detect the first incoming wave based on the reception signal received by each of the plurality of wireless communication sections 210. Furthermore, the positional parameter may be estimated by the wireless communication section 210 that functions as the master.

For example, the above embodiments have described the examples where the angles α and β are calculated based on antenna array phase differences between antenna pairs. However, the present invention is not limited to these embodiments. For example, the communication unit 200 may calculate the angles α and β by performing beamforming using the plurality of antennas 211. In this case, the communication unit 200 scans main lobes of the plurality of antennas 211 in all the directions, decides that the portable device 100 exists in a direction with largest reception electric power, and calculates the angles α and β based on this direction.

For example, the above embodiments have been described with reference to FIG. 3 assuming that the local coordinate system is a coordinate system including coordinate axes parallel to axes connecting the antenna pairs. However, the present invention is not limited to these embodiments. For example, the local coordinate system may be a coordinate system including coordinate axes that are not parallel to the axes connecting the antenna pairs. Furthermore, the origin is not limited to the center of the plurality of antennas 211. The local coordinate system according to the present embodiment may be arbitrarily set based on arrangement of the plurality of antennas 211 of the communication unit 200.

For example, the above embodiments have described the examples where the four antennas 211 constitute the 2×2 planner array. However, the present invention is not limited to these embodiments. The number of the antennas 211 is not limited to four. The arrangement shape of the antennas 211 is not limited to the planner array. For example, the plurality of antennas 211 may be arranged as a linear array. The linear array refers to arrangement of the plurality of antennas 211 in a line. For example, an example where the four antennas 211 constitute the linear array will be described with reference to FIG. 20.

Figure 20:
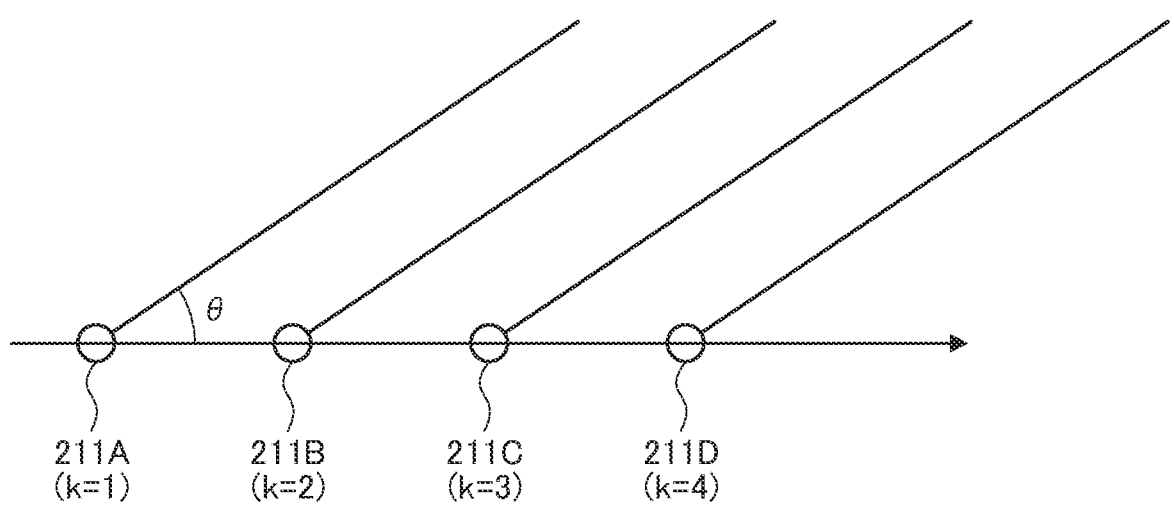
FIG. 20 is a view for describing a case where four antennas constitute a linear array.

FIG. 20 is a view for describing a case where the four antennas 211 constitute a linear array. As illustrated in FIG. 20, the antenna 211A to the antenna 211D constitute the linear array. An axis on which the antenna 211A to the antenna 211D are arranged serves as a coordinate axis. An angle formed between the coordinate axis and an arrival direction of a reception signal is 0. Furthermore, the antenna 211A is referred to as a first antenna (i.e., k=1). The antenna 211B is referred to as a second antenna (i.e., k=2). The antenna 211C is referred to as a third antenna (i.e., k=3). The antenna 211D is referred to as a fourth antenna (i.e., k=4). In the case where (k=1) serves as the reference antenna, Bk is respectively expressed by a following equation.

[Mathematical 60]

$$B_k = \text{diag}\left[e^{-j\frac{2\pi}{\lambda}(k-1)d\cos\theta_{01}}, \ldots, e^{-j\frac{2\pi}{\lambda}(k-1)d\cos\theta_{0L}}\right] \in \mathbb{C}^{L \times L} \quad (60)$$

For example, the above embodiments have described the examples where the M-FOCUSS is applied to the plurality of CIRs of the plurality of wireless communication sections 210. However, the present invention is not limited to these embodiments. The M-FOCUSS may be applied to a plurality of CIRs obtained from the one wireless communication section 210. In this case, the control section 230 converts a matrix obtained by arranging the plurality of CIRs obtained from the one wireless communication section 210 into a data matrix, and converts the data matrix into a format including a matrix product of the expanded modal matrix and an expanded signal matrix obtained by arranging expanded signal vectors for the plurality of CIRs. Furthermore, the control section 230 estimates the reception time of the first incoming wave by applying the M-FOCUSS to such a conversion result. In such an example, it is possible to improve estimation accuracy of the reception time of the first incoming wave similarly to the above embodiments.

For example, the one wireless communication section 210 may receive a signal including a plurality of preambles from the portable device 100. In this case, the control section 230 calculates one CIR for one preamble received by the wireless communication section 210. Furthermore, the control section 230 converts the plurality of CIRs calculated from the plurality of preambles into the format including the above matrix product, and applies the M-FOCUSS to the format.

For another example, the one wireless communication section 210 may receive a signal from the portable device 100 a plurality of times. Here, the signal is a signal including one or more preambles. In this case, the control section 230 calculates one CIR for one signal received by the wireless communication section 210. Furthermore, the control section 230 converts the plurality of CIRs calculated from a signal received a plurality of times into the format including the above matrix product, and applies the M-FOCUSS to the format.

Note that, in the case where the M-FOCUSS is applied to the plurality of CIRs obtained from the one wireless communication section 210, Bk is expressed by the following equation.

[Mathematical 61]

$$B_k = \text{diag}[1, \ldots, 1] = I \in \mathbb{C}^{L \times L} \quad (61)$$

On the other hand, the control section 230 may apply the FOCUSS to one CIR obtained from the one wireless communication section 210.

For example, the above embodiments have described the examples where the authenticatee is the portable device 100 and the authenticator is the communication unit 200. However, the present invention is not limited to these embodiments. The roles of the portable device 100 and the communication unit 200 may be reversed. For example, the portable device 100 may specify the positional parameter. Furthermore, the roles of the portable device 100 and the communication unit 200 may be switched dynamically. Furthermore, the communication units 200 may specify the positional parameters, and authenticate each other.

For example, the above embodiments have described the examples where the present invention is applied to the smart entry system. However, the present invention is not limited to these embodiments. The present invention is applicable to any system that estimates the positional parameter and performs authentication by transmitting/receiving signals. For example, the present invention is applicable to a pair including any two devices among portable devices, vehicles, smartphones, drones, houses, home appliances, and the like. In this case, the one device in the pair operates as the authenticator, and the other one device in the pair operates as the authenticatee. Note that the pair may include two devices of a same type, or may include two devices of different types. Furthermore, the present invention is applicable to a case where a wireless Local Area Network (LAN) router specifies a position of a smartphone.

For example, the above embodiments have been exemplified assuming that the UWB is used as the wireless communication standards. However, the present invention is not limited to these embodiments.

For example, it is also possible to use infrared rays as the wireless communication standards.

In addition, a series of processes performed by the respective devices described in this specification may be achieved by programs stored in a non-transitory computer readable storage medium. For example, when a computer executes the programs, the programs are read into a Random Access Memory (RAM), and executed by a processor such as a CPU. The above storage medium may be, for example, a magnetic disk, an optical disc, a magneto-optical disc, a flash memory, or the like. Furthermore, the above programs may be distributed via a network without using the storage medium, for example.

Furthermore, in this specification, the processes described using flowcharts may not necessarily be executed in the order illustrated in the drawings. Some processing steps may be executed in parallel. Furthermore, additional processing steps may be employed, and part of the processing steps may be omitted.

What is claimed is:

1. A communication device comprising:
   a wireless communication section configured to wirelessly receive a signal from another communication device; and
   a control section configured to
      correlate a first signal with a second signal at a designated interval,
   the second signal being a signal associated with the first signal, and being received by the wireless communication section in a case where the other communication device transmits a signal including a pulse as the first signal,
      convert a data matrix into a format including a matrix product of an expanded modal matrix and an expanded signal matrix, the data matrix being a matrix obtained by arranging one or a plurality of correlation computation results that are each a result obtained by correlating the first signal with the second signal of the wireless communication section at the designated interval, the expanded modal matrix being a matrix including a plurality of elements indicating the correlation computation results obtained on an assumption that the signal is received at respective set times, the expanded signal matrix being a matrix obtained by arranging expanded signal vectors for the one or the plurality of correlation computation results, and the expanded signal vector being a vector including a plurality of elements each indicating whether or not there is the signal of the wireless communication section at each of the set times, and an amplitude and a phase of the signal,
   estimate the expanded signal matrix that minimizes a predetermined norm by iterative calculation that uses a regularization parameter that is a positive infinitesimal, and
   estimate a reception time of the second signal based on the expanded signal matrix that minimizes the predetermined norm,
   wherein the control section executes the iterative calculation separately at a plurality of stages, sets a value of the regularization parameter used for the iterative calculation at or after a second stage of the plurality of stages to a value of the regularization parameter or more used for the iterative calculation at a previous stage, and changes the value of the regularization parameter based on a reception status of the second signal during the iterative calculation at or after the second stage, and
   wherein the control section measures a distance between the communication device and the other communication device based on the reception time of the second signal.

2. The communication device according to claim 1, wherein the control section changes the value of the regularization parameter based on an interval of an incoming wave related to the second signal during the iterative calculation at or after the second stage.

3. The communication device according to claim 2, wherein the control section makes the value of the regularization parameter smaller during the iterative calculation at or after the second stage as an interval of the incoming wave related to the second signal is longer.

4. The communication device according to claim 1, wherein the control section sets the value of the regularization parameter based on signal power related to the second signal during the iterative calculation at or after the second stage.

5. The communication device according to claim 1, wherein the control section sets the value of the regularization parameter based on noise power related to the second signal during the iterative calculation at or after the second stage.

6. The communication device according to claim 5, wherein the control section sets the value of the regularization parameter based on a signal to noise ratio related to the second signal during the iterative calculation at or after the second stage.

7. The communication device according to claim 6, wherein the control section makes the value of the regularization parameter smaller during the iterative calculation at or after the second stage as the value of the signal to noise ratio related to the second signal is larger.

8. The communication device according to claim 6, wherein the control section sets the value of the regularization parameter to a first value in a case where the signal to noise ratio related to the second signal is larger than a specified value, and sets the value of the regularization parameter to a value larger than the first value in a case where the signal to noise ratio related to the second signal is the specified value or less.

9. The communication device according to claim 5, wherein the control section calculates the noise power related to the second signal according to an equation (5) during the iterative calculation,

[Mathematical 5]

$$\sigma^{2(m)} = \frac{1}{MK}\|Z \to Ay_m\|_F^2 + \frac{\sigma^{2(m-1)}}{M}Tr\left[G_m\left(\sigma^{2(m-1)}I + G_m\right)^{-1}\right] \quad (5)$$

$$G_m \triangleq AW_m A^T$$

where $\sigma^{2(m)}$ represents the noise power, M represents a number of times of sampling of a time, K represents a number of elements, $\|\cdot\|_F$ represents a Frobenius norm, and $Tr[\cdot]$ represents a trace of a matrix (a sum of diagonal components).

10. The communication device according to claim 1, wherein, regarding a convergence decision value used for convergence decision of the iterative calculation, the control section makes the convergence decision value used for the iterative calculation at or after the second stage smaller than the convergence decision value used for the iterative calculation at the previous stage.

11. The communication device according to claim 1, wherein the control section estimates the expanded signal matrix that minimizes a norm of a vector as the predetermined norm, the vector being obtained by arranging values for the plurality of set times, and the values being obtained by performing predetermined computation on a plurality of elements corresponding to a same set time among elements included in the expanded signal matrix.

12. The communication device according to claim 11, wherein the control section estimates the expanded signal matrix that minimizes a norm of a vector as the predetermined norm, the vector being obtained by arranging square roots of values for the plurality of set times, and the square roots of the values being obtained by summing squares of a plurality of elements corresponding to a same set time among elements included in the expanded signal matrix.

13. The communication device according to claim 12, wherein the control section estimates the expanded signal matrix that minimizes the predetermined norm by iteratively calculating an equation (1), an equation (2), and an equation (3) during the iterative calculation,

[Mathematical 1]

$$W_m = \text{diag}\left(\|y_{m-1}[1]\|_2^{1-p/2}, \ldots, \|y_{m-1}[N]\|_2^{1-p/2}\right) \quad (1)$$

[Mathematical 2]

$$Q_m = A_m^H \left(A_m A_n^H + \alpha I\right)^{-1} Z \quad (2)$$
$$\text{with } A_m = AW_m$$

[Mathematical 3]

$$Y_m = W_m Q_m \quad (3)$$

where $Y_m$ represents a candidate of the expanded signal matrix that minimizes the predetermined norm, m represents the number of times of iteration, $y_{m-1}[i]$ represents a vector included in $Y_{m-1}$, and including an element corresponding to an i-th set time in the expanded signal matrix, N represents a maximum value of an index i of the set time, p represents a constant that is 0 or more and 1 or less, $\lambda$ represents the expanded modal matrix, Z represents the data matrix, $\alpha$ represents the regularization parameter, I represents an identify matrix, and an initial value $Y_0$ of $Y_m$ is given by an equation (4), and

[Mathematical 4]

$$Y_0 = A^- Z \quad (4)$$

where $A^-$ represents a generalized inverse matrix of A.

14. An information processing method comprising:
correlating a first signal with a second signal at a designated interval, the second signal being a signal associated with the first signal, and being received by a wireless communication section of a communication device in a case where another communication device transmits a signal including a pulse as the first signal;
converting a data matrix into a format including a matrix product of an expanded modal matrix and an expanded signal matrix, the data matrix being a matrix obtained by arranging one or a plurality of correlation computation results that are each a result obtained by correlating the first signal with the second signal of the wireless communication section at the designated interval, the expanded modal matrix being a matrix including a plurality of elements indicating the correlation computation results obtained on an assumption that the signal is received at respective set times, the expanded signal matrix being a matrix obtained by arranging expanded signal vectors for the one or the plurality of correlation computation results, and the expanded signal vector being a vector including a plurality of elements each indicating whether or not there is the signal of the wireless communication section at each of the set times, and an amplitude and a phase of the signal;
estimating the expanded signal matrix that minimizes a predetermined norm by iterative calculation that uses a regularization parameter that is a positive infinitesimal; and
estimating a reception time of the second signal based on the expanded signal matrix that minimizes the predetermined norm,
wherein the estimating further includes executing the iterative calculation separately at a plurality of stages, setting a value of the regularization parameter used for the iterative calculation at or after a second stage of the plurality of stages to a value of the regularization parameter or more used for the iterative calculation at a previous stage, and changing the value of the regularization parameter based on a reception status of the second signal during the iterative calculation at or after the second stage, and
measuring a distance between the communication device and the other communication device based on the reception time of the second signal.

15. A non-transitory computer-readable storage medium that stores a program causing a computer to function as
a control section configured to
correlate a first signal with a second signal at a designated interval, the second signal being a signal associated with the first signal, and being received by a wireless communication section of a communication device in a case where another communication device transmits a signal including a pulse as the first signal, convert a data matrix into a format including a matrix product of an expanded modal matrix and an expanded signal matrix, the data matrix being a matrix obtained by arranging one or a plurality of correlation computation results that are each a result obtained by correlating the first signal with the second signal of the wireless communication section at the designated interval, the expanded modal matrix being a matrix including a plurality of elements indicating the correlation computation results obtained on an assumption that the signal is received at respective set times, the expanded signal matrix being a matrix obtained by arranging expanded signal vectors for the plurality of correlation computation results, and the expanded signal vector being a vector including a plurality of elements each indicating whether or not there is the signal of the wireless communication section at each of the set times, and an amplitude and a phase of the signal, estimate the expanded signal matrix that minimizes a predetermined norm by iterative calculation that uses a regularization parameter that is a positive infinitesimal, and estimate a reception time of the second signal based on the expanded signal matrix that minimizes the predetermined norm, wherein the program causes the control section to execute the iterative calculation separately at a plurality of stages, set a value of the regularization parameter used for the iterative calculation at or after a second stage of the plurality of stages to a value of the regularization parameter or more used for the iterative calculation at a previous stage, and change the value of the regularization parameter based on a reception status of the second signal during the iterative calculation at or after the second stage, and wherein the control section measures a distance between the communication device and the other communication device based on the reception time of the second signal.

* * * * *